United States Patent
Yamamura

(10) Patent No.: US 10,001,720 B2
(45) Date of Patent: Jun. 19, 2018

(54) EXPOSURE UNIT, IMAGE FORMING UNIT, AND IMAGE FORMING APPARATUS

(71) Applicant: Oki Data Corporation, Tokyo (JP)

(72) Inventor: Akihiro Yamamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days. days.

(21) Appl. No.: 15/410,747

(22) Filed: Jan. 19, 2017

(65) Prior Publication Data

US 2017/0212446 A1 Jul. 27, 2017

(30) Foreign Application Priority Data

Jan. 22, 2016 (JP) .................................. 2016-010500

(51) Int. Cl.
*G03G 15/04* (2006.01)
*H04N 1/401* (2006.01)
*H04N 1/028* (2006.01)
*B41J 2/45* (2006.01)

(52) U.S. Cl.
CPC ........ *G03G 15/04036* (2013.01); *B41J 2/451* (2013.01); *G03G 15/0409* (2013.01); *H04N 1/02885* (2013.01); *H04N 1/401* (2013.01); *H04N 2201/0094* (2013.01)

(58) Field of Classification Search
CPC ........................... G03G 15/04036; B41J 2/451
See application file for complete search history.

(56) References Cited

U.S. PATENT DOCUMENTS

| 4,700,206 A | 10/1987 | Yamakawa | |
|---|---|---|---|
| 2003/0122920 A1* | 7/2003 | Takagi | B41J 2/451 |
| | | | 347/244 |
| 2006/0214597 A1* | 9/2006 | Seto | B41J 2/451 |
| | | | 315/169.3 |
| 2010/0124440 A1 | 5/2010 | Inagaki | |
| 2012/0269552 A1 | 10/2012 | Sato | |

FOREIGN PATENT DOCUMENTS

| JP | H11-188910 A | 7/1999 |
|---|---|---|
| JP | 2007-271964 A | 10/2007 |

* cited by examiner

*Primary Examiner* — Victor Verbitsky
(74) *Attorney, Agent, or Firm* — Rabin & Berdo, P.C.

(57) ABSTRACT

An exposure unit includes a light-emitting element array and a lens array. The light-emitting element array includes a plurality of light-emitting elements that are disposed in a first direction and each emit a light beam. The lens array faces the light-emitting element array in a second direction that is orthogonal to the first direction, and focuses the light beams emitted from the respective light-emitting elements. The following expression [3] is satisfied. A symmetric property, determined from the following expression [1], of a light amount distribution in the first direction of at least one of the light beams focused by the lens array satisfies the following expression [2].

$$S=|(HL-HR)/(XE/2)| \quad [1]$$

$$0 \leq S \leq 0.65 \quad [2]$$

$$Lo \neq LB \quad [3]$$

15 Claims, 28 Drawing Sheets

EXAMPLE 1-3

EXAMPLE 1-4

EXPOSURE UNIT, IMAGE FORMING UNIT, AND IMAGE FORMING APPARATUS

CROSS REFERENCE TO RELATED APPLICATIONS

The present application claims priority from Japanese Patent Application No. 2016-010500 filed on Jan. 22, 2016, the entire contents of which are hereby incorporated by reference.

BACKGROUND

The technology relates to an image forming unit that forms an image by an electrophotographic method, to an image forming apparatus provided with the image forming unit, and to an exposure unit that is used in the image forming unit and the image forming apparatus.

Various image forming apparatuses, such as an electronic printer and a facsimile apparatus, that form images by an electrophotographic method each use an exposure unit. The exposure unit may include light-emitting elements such as light-emitting diode (LED) elements and a lens array. For example, reference is made to Japanese Unexamined Patent Application Publication Nos. 2007-271964 and H11-188910.

SUMMARY

An image forming apparatus provided with an exposure unit may involve a quality issue such as streaks that occurs on a formed image, i.e., unevenness of density in a first scanning direction due to streaks extending in a second scanning direction. This issue is attributable to variations in optical characteristics between a plurality of rod lenses included in a lens array.

It is desirable to provide an image forming unit and an image forming apparatus that allow for image formation with improved quality, and an exposure unit that is to be favorably mounted on the image forming unit and the image forming apparatus.

According to one embodiment of the technology, there is provided an exposure unit including a light-emitting element array and a lens array. The light-emitting element array includes a plurality of light-emitting elements that are disposed in a first direction and each emit a light beam. The lens array faces the light-emitting element array in a second direction that is orthogonal to the first direction, and focuses the light beams emitted from the respective light-emitting elements. The following expression [3] is satisfied. A symmetric property, determined from the following expression [1], of a light amount distribution in the first direction of at least one of the light beams focused by the lens array satisfies the following expression [2].

$$S=|(HL-HR)/(XE/2)| \quad [1]$$

$$0 \leq S \leq 0.65 \quad [2]$$

$$Lo \neq LB \quad [3]$$

where S is the symmetric property of the light amount distribution in the first direction of any of the light beams focused by the lens array, XE is a dimension of any of the light-emitting elements in the first direction, HL is a difference between a local maximum position and a first local minimum position that are adjacent to each other in the light amount distribution in the first direction of any of the light beams focused by the lens array, HR is a difference between the local maximum position and a second local minimum position in the light amount distribution in the first direction of any of the light beams focused by the lens array, the second local minimum position being adjacent to the local maximum position and located on an opposite side of the local maximum position to the first local minimum position, Lo is a distance from the light-emitting element array to the lens array, and LB is a focal distance of the lens array in which a contrast becomes maximum, the contrast being determined from the light amount distribution in the first direction of any of the light beams focused by the lens array.

According to one embodiment of the technology, there is provided an image forming unit provided with an exposure unit. The exposure unit includes a light-emitting element array and a lens array. The light-emitting element array includes a plurality of light-emitting elements that are disposed in a first direction and each emit a light beam. The lens array faces the light-emitting element array in a second direction that is orthogonal to the first direction, and focuses the light beams emitted from the respective light-emitting elements. The following expression [3] is satisfied. A symmetric property, determined from the following expression [1], of a light amount distribution in the first direction of at least one of the light beams focused by the lens array satisfies the following expression [2].

$$S=|(HL-HR)/(XE/2)| \quad [1]$$

$$0 \leq S \leq 0.65 \quad [2]$$

$$Lo \neq LB \quad [3]$$

where S is the symmetric property of the light amount distribution in the first direction of any of the light beams focused by the lens array, XE is a dimension of any of the light-emitting elements in the first direction, HL is a difference between a local maximum position and a first local minimum position that are adjacent to each other in the light amount distribution in the first direction of any of the light beams focused by the lens array, HR is a difference between the local maximum position and a second local minimum position in the light amount distribution in the first direction of any of the light beams focused by the lens array, the second local minimum position being adjacent to the local maximum position and located on an opposite side of the local maximum position to the first local minimum position, Lo is a distance from the light-emitting element array to the lens array, and LB is a focal distance of the lens array in which a contrast becomes maximum, the contrast being determined from the light amount distribution in the first direction of any of the light beams focused by the lens array.

According to one embodiment of the technology, there is provided an image forming apparatus provided with an exposure unit. The exposure unit includes a light-emitting element array and a lens array. The light-emitting element array includes a plurality of light-emitting elements that are disposed in a first direction and each emit a light beam. The lens array faces the light-emitting element array in a second direction that is orthogonal to the first direction, and focuses the light beams emitted from the respective light-emitting elements. The following expression [3] is satisfied. A symmetric property, determined from the following expression [1], of a light amount distribution in the first direction of at least one of the light beams focused by the lens array satisfies the following expression [2].

$$S=|(HL-HR)/(XE/2)| \quad [1]$$

$$0 \leq S \leq 0.65 \quad [2]$$

$$Lo \neq LB \quad [3]$$

where S is the symmetric property of the light amount distribution in the first direction of any of the light beams focused by the lens array, XE is a dimension of any of the light-emitting elements in the first direction, HL is a difference between a local maximum position and a first local minimum position that are adjacent to each other in the light amount distribution in the first direction of any of the light beams focused by the lens array, HR is a difference between the local maximum position and a second local minimum position in the light amount distribution in the first direction of any of the light beams focused by the lens array, the second local minimum position being adjacent to the local maximum position and located on an opposite side of the local maximum position to the first local minimum position, Lo is a distance from the light-emitting element array to the lens array, and LB is a focal distance of the lens array in which a contrast becomes maximum, the contrast being determined from the light amount distribution in the first direction of any of the light beams focused by the lens array.

DETAILED DESCRIPTION

Some example embodiments of the technology are described below in detail with reference to the drawings. The example embodiments referred to in the description below are mere specific examples of the technology. The technology is therefore not limited to the example embodiments described below. Factors such as arrangements, dimensions, and dimension ratios of components of the technology are not limited to those illustrated in the respective drawings. The description is given in the following order.

1. First Example Embodiment
An exposure unit including a light-emitting element array and a lens array
2. Second Example Embodiment
An image forming unit and an image forming apparatus with the exposure unit
3. Examples
4. Other Modifications

1. EXAMPLE EMBODIMENT

[Outline Configuration of Exposure Unit 3]

Figure 1:
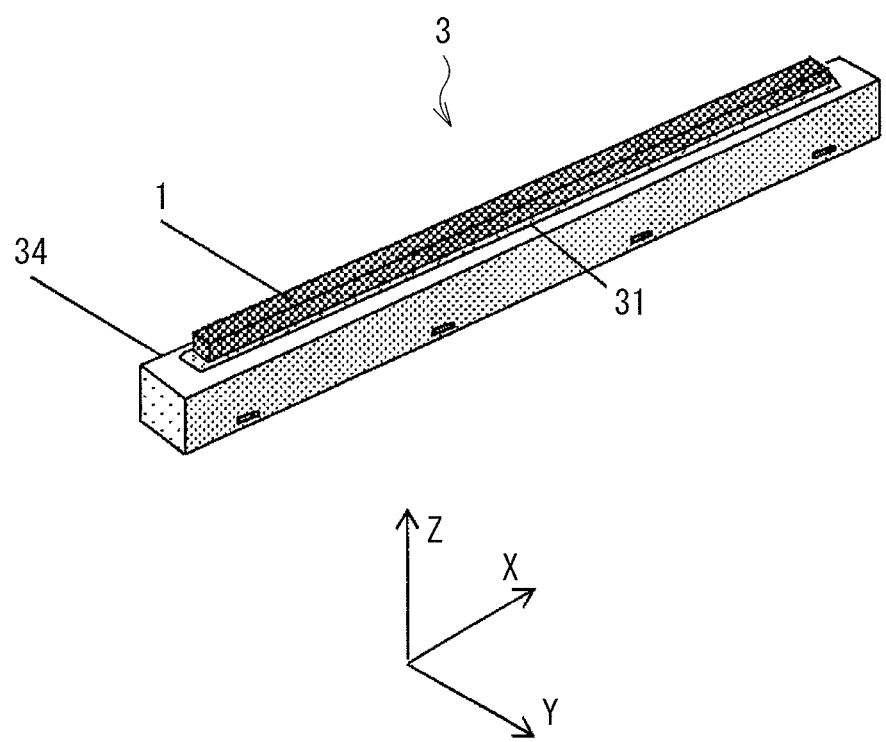
FIG. 1 is a perspective view of an overall configuration example of an exposure unit according to one example embodiment of the technology.
Figure 2:
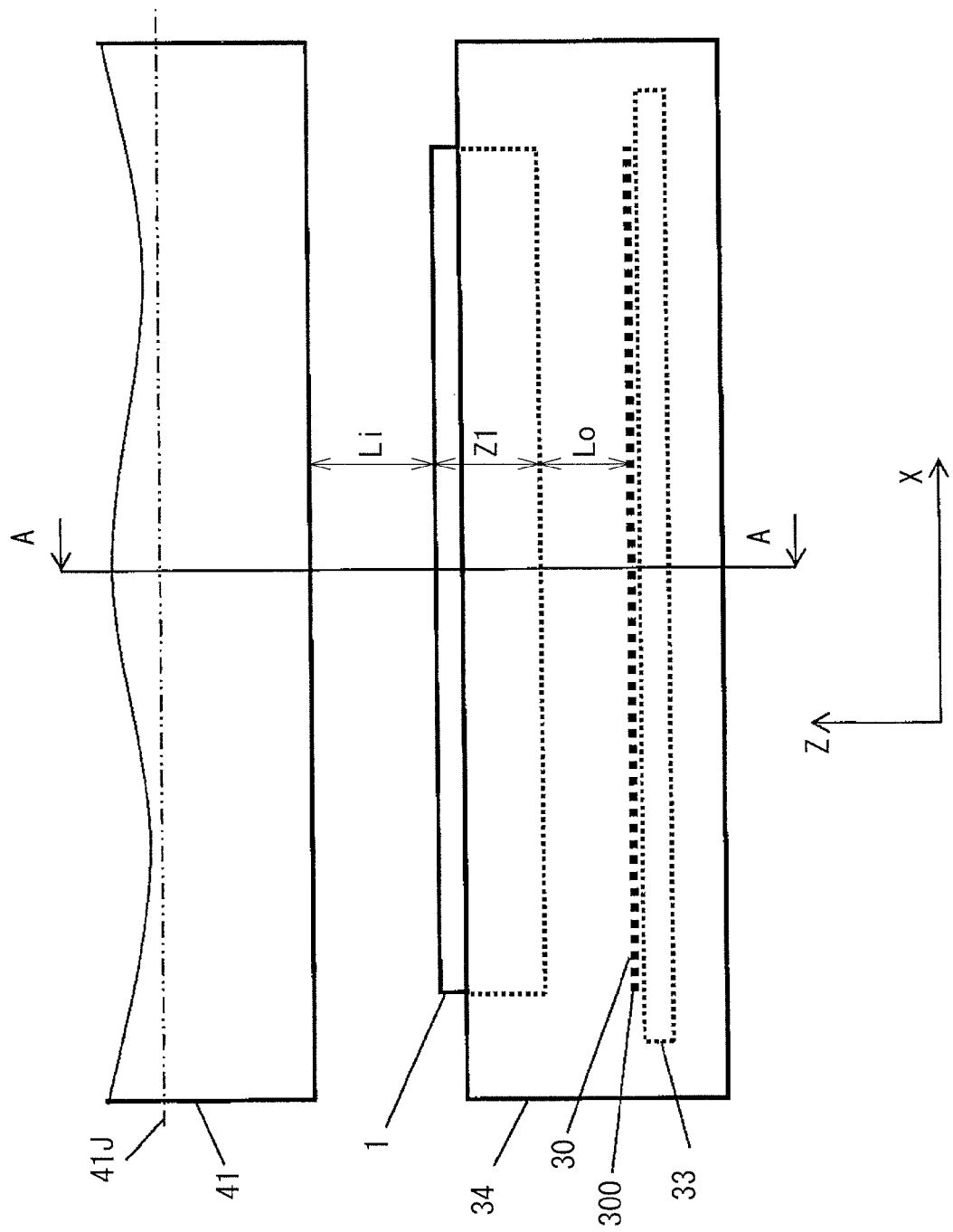
FIG. 2 is a side view of the exposure unit illustrated in FIG. 1.
Figure 3:
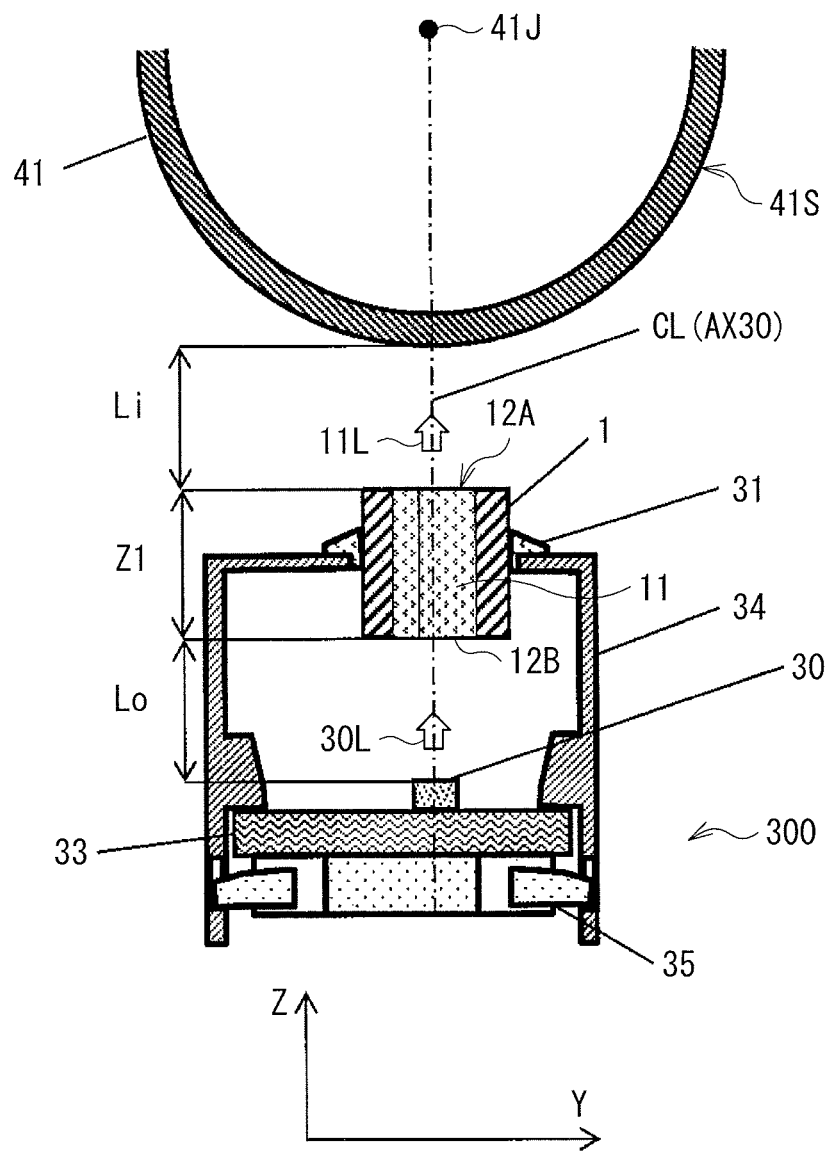
FIG. 3 is a cross-sectional view of the exposure unit illustrated in FIG. 1.

FIG. 1 is a perspective view of an overall configuration example of an exposure unit 3 according to a first example embodiment of the technology. FIGS. 2 and 3 are a side view and a cross-sectional view of the exposure unit 3, respectively. The exposure unit 3 may correspond to an "exposure unit" in one specific but non-limiting example of the technology.

The exposure unit 3 may be a so-called light-emitting diode (LED) head. The exposure unit 3 may include a lens array 1, a LED array 300, and a holder 34. The holder 34 may hold the lens array 1 and the LED array 300. The lens array 1 may be fixed to an upper part of the holder 34 by a sealing member 31, for example. The LED array 300 may include a base 35, a wiring substrate 33, and a plurality of LED elements 30. The wiring substrate 33 may be supported by the base 35. The LED elements 30 may be disposed, on the wiring substrate 33, in a line in an X-axis direction, for example. The LED array 300 may be fixed to a lower part of the holder 34, for example. Referring to FIGS. 2 and 3, the holder 34 may hold the lens array 1 and the LED elements 30 with a spacing of a distance Lo in between in an optical axis direction of the LED elements 30. The optical axis direction of the LED elements 30 may correspond to a Z-axis direction. The X-axis direction may correspond to a "first direction" in one specific but non-limiting embodiment of the technology.

Figure 4:
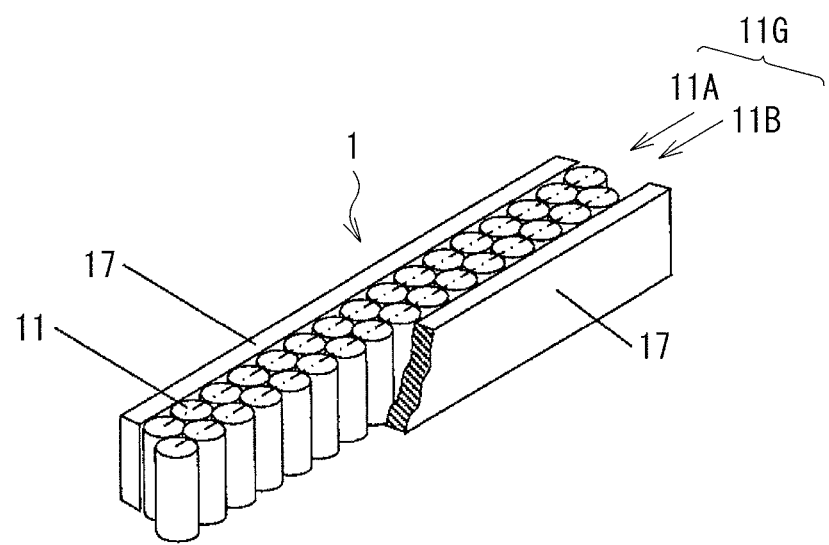
FIG. 4 is an enlarged perspective view of an example of a lens array illustrated in FIG. 1.
Figure 4:
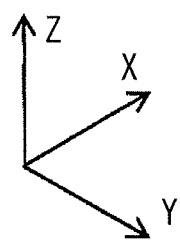

FIG. 4 is a partial cutaway perspective view of an example of the lens array 1 in an enlarged manner. Referring to FIG. 4, the lens array 1 may include a lens group 11G and a pair of side plates 17. The pair of side plates 17 may face each other as to sandwich, in a Y-axis direction, the lens group 11G in between. The Y-axis direction is orthogonal to both the X-axis direction and the Z-axis direction. The lens group 11G may include a first rod lens line 11A and a second rod lens line 11B that are adjacent to each other in the Y-axis direction, for example. The first rod lens line 11A may include rod lenses 11 that each have a substantially-cylindrical shape and are disposed in the X-axis direction, for example. Similarly, the second rod lens line 11B may include the rod lenses 11 that each have the substantially-cylindrical shape and are disposed in the X-axis direction. A space between the rod lenses 11 and a space between the rod lenses 11 and the side plates 17 may be filled with an adhesive agent.

Figure 5:
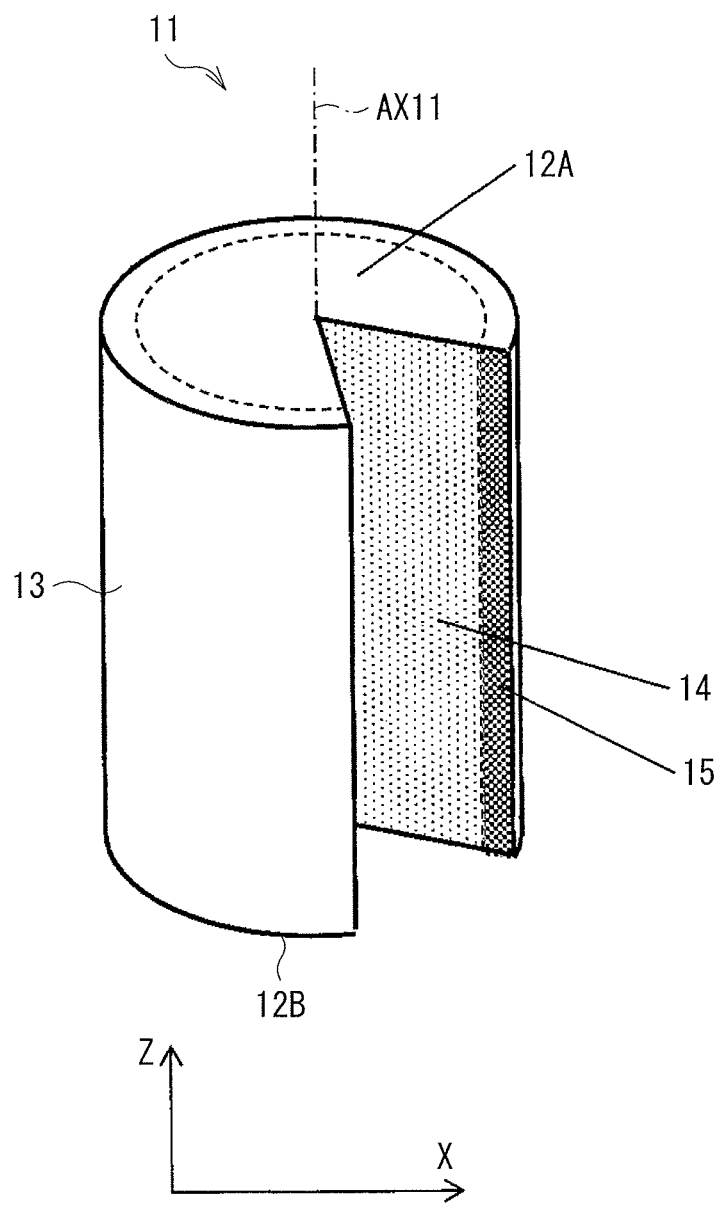
FIG. 5 is an exploded and enlarged perspective view of an example of a rod lens illustrated in FIG. 4.

FIG. 5 is a perspective view of a part of an example of an internal structure of the rod lens 11. The rod lens 11 may be a transparent member that has a substantially-cylindrical shape and has a central axis AX11 extending in the Z-axis direction. The rod lens 11 may have a pair of end surfaces 12A and 12B and a circumferential surface 13. Light beams may enter and be output from the end surfaces 12A and 12B. The rod lens 11 may include a light absorption layer 15 in the vicinity of the circumferential surface 13. The rod lens 11 may also include a lens part 14 on the inner side of the light absorption layer 15. The lens part 14 may have a refractive index distribution in which a refractive index decreases from the circumferential surface 13 toward the central axis AX11. The light absorption layer 15 may include a medium having a refractive index substantially the same as the refractive index of an outermost portion of the lens part 14 and a light beam absorbing substance dispersed in the medium, for example. Non-limiting examples of the light beam absorbing substance may include a dye and a pigment.

All of the rod lenses 11 and the pair of side plates 17 that sandwich the rod lenses 11 in between may have the same dimension in the Z-axis direction, which is referred to in this example as a "height Z1". Accordingly, the dimension of the lens array 1 in the Z-axis direction may also be the height Z1.

The exposure unit 3 may be mounted on an image forming apparatus such as an electronic printer which will be described later, for example. Referring to FIG. 3, upon being mounted on the image forming apparatus, the exposure unit 3 may be so disposed as to face a target to apply light beams onto such as a photosensitive drum 41, for example. In such a case, a rotation axis 41J of the photosensitive drum 41 may be preferably located on a line extended from a central position CL, of the exposure unit 3, which extends in the Y-axis direction. The foregoing central position CL of the exposure unit 3 may be coincident with an optical axis AX30 of any of the LED elements 30. The photosensitive drum 41 may be so disposed that the rotation axis 41J is parallel to the X-axis, for example. Further, a surface 41S of the photosensitive drum 41 and the end surface 12A of each of the rod lenses 11 included in the lens array 1 may be so kept to have a spacing of a distance Li at the central position CL of the exposure unit 3. The distance Li may be preferably coincident with the distance Lo.

The LED array 300 in the exposure unit 3 may have resolution of 600 dpi or 1200 dpi, for example. When the LED array 300 has the resolution of 600 dpi, six-hundred LED elements 30 are provided per 1 inch (equals to about 25.4 mm). In other words, the LED elements 30 have an array pitch PE of about 0.04233 mm. When the LED array 300 has the resolution of 1200 dpi, one-thousand-and-two-hundred LED elements 30 are provided per 1 inch. In other words, the LED elements 30 have the array pitch PE of about 0.021167 mm. The LED element 30 may have a light-emission wavelength with a central value of about 770 nm, for example.

Figure 6A:
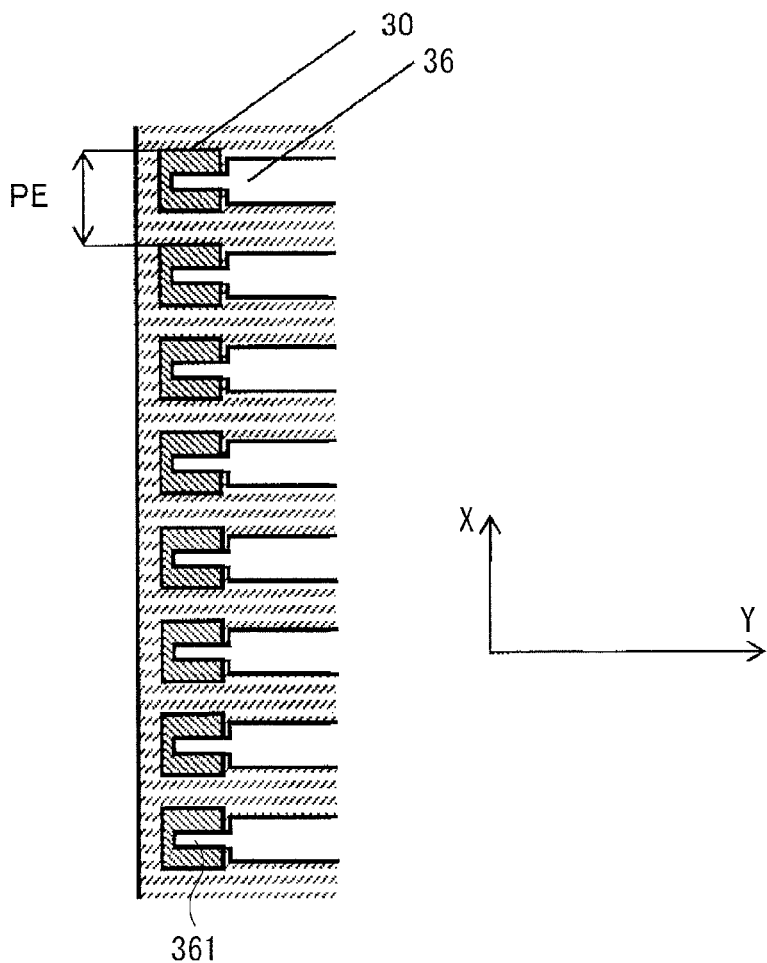
FIG. 6A is an enlarged plan view of an example of a light-emitting element array illustrated in FIG. 2.
Figure 6B:
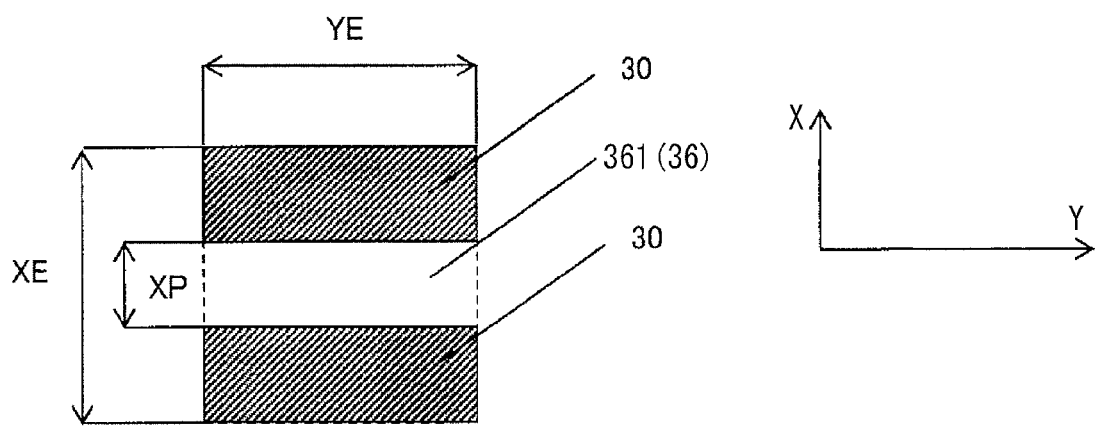
FIG. 6B is an enlarged plan view of an example of a light-emitting element illustrated in FIG. 6A.

FIG. 6A is an enlarged plan view of a part of an example of the LED array 300 illustrated in FIG. 2, etc. FIG. 6B is an enlarged plan view of an example of any one of the LED elements 30 illustrated in FIG. 6A. Referring to FIG. 6A, the LED elements 30 may be disposed, in the X-axis direction, with the array pitch PE. The LED elements 30 may each be coupled to one end of an electrode 36. Referring to FIG. 6B, a dimension, in the X-axis direction, of any one of the LED elements 30 may be referred to as a width XE, and a dimension, in the Y-axis direction, of any one of the LED elements 30 may be referred to as a length YE. A dimension, in the X-axis direction, of a tip end 361 of the electrode 36 that is overlaid on the LED element 30 may be referred to as a width XP.

[Workings of Exposure Unit 3]

The exposure unit 3 may have a configuration in which, upon application of a voltage to each of the LED elements 30 in the LED array 300 via the electrode 36, the LED elements 30 each emit a light beam 30L having predetermined intensity in accordance with the applied voltage. Referring to FIG. 3, each of the light beams 30L emitted by the respective LED elements 30 may enter the rod lens 11 through the end surface 12B. Each of the light beams 30L that has entered the rod lens 11 may be focused by the rod lens 11 to be output from the end surface 12A as a light beam 11L. The light beam 11L that has been output from the end surface 12A may travel directly toward a target of the exposure such as the photosensitive drum 41.

Figure 7:
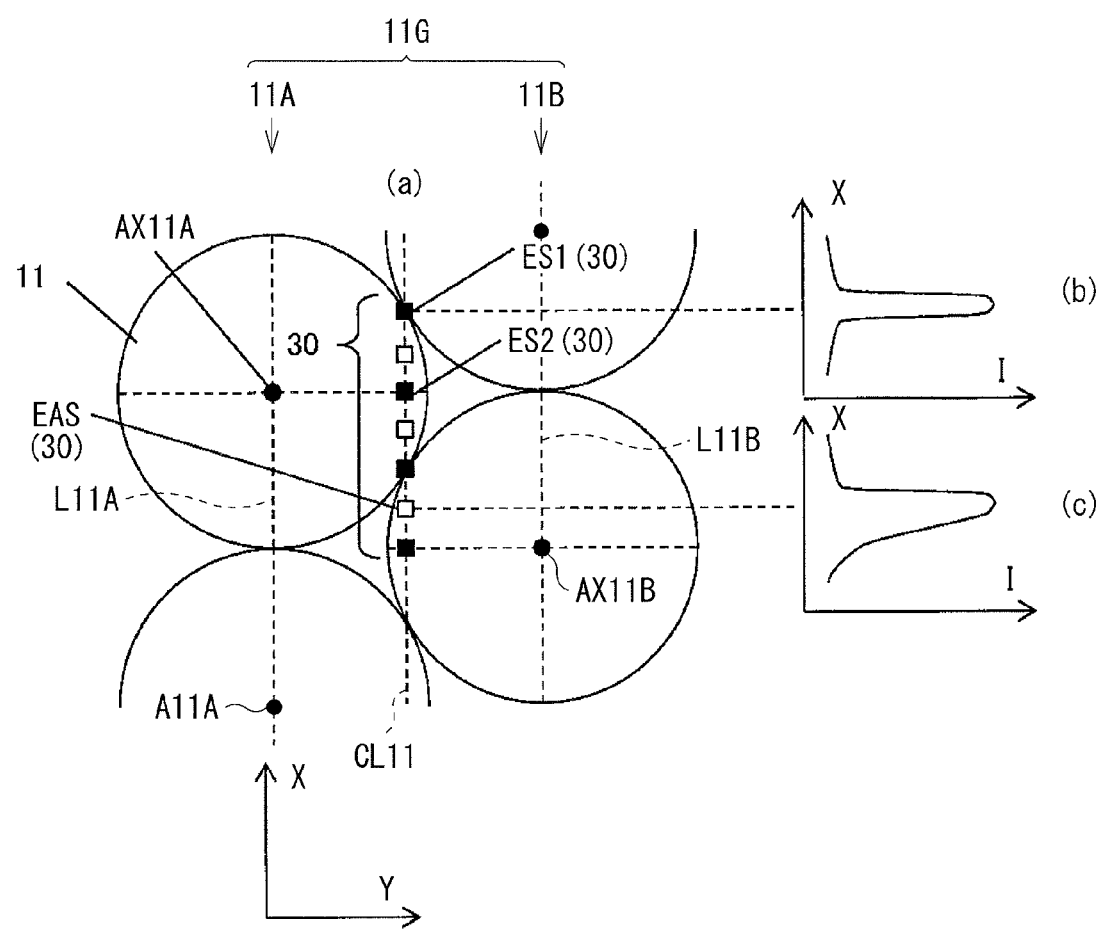
FIG. 7 schematically describes an example of a relationship between light amount distributions of formed optical images and relative positions of the light-emitting elements with respect to the rod lenses.

Referring to FIG. 7, a description is given below of a shape of the optical image, of the light beam 11L, formed by the lens array 1. Part (a) in FIG. 7 illustrates a positional relationship between the lens array 1 and the LED elements 30 in an X-Y plane. In FIG. 7, positions, in an X-Y plane, of the rod lenses 11 and positions, in the X-Y plane, of the LED elements 30 are projected onto the same paper plane (are overlapped with each other). In the present example, the LED elements 30 may be preferably disposed on a line CL11 that is located at the substantial center, in the Y-axis direction, of the rod lenses 11 disposed in two lines. Specifically, the LED elements 30 may be preferably disposed on the line CL11 that is located substantially equally distant from both a line L11A and a line L11B. The line L11A extends in the X-axis direction through central axes AX11A of the respective rod lenses 11 included in the first rod lens line 11A. The line L11B extends in the X-axis direction through central axes AX11B of the respective rod lenses 11 included in the second rod lens line 11B. However, the arrangement of the LED elements 30 is not limited to the foregoing arrangement and may be any other arrangement.

Referring to FIG. 7, ES1 denotes a position of the LED element 30 located on a point of contact of the two adjacent rod lenses 11, and ES2 denotes a position of the LED element 30 having an X-coordinate that is equal to one of an X-coordinate of the central axis AX11A and an X-coordinate of the central axis AX11B of the rod lenses 11, out of the LED elements 30 having the foregoing arrangement. The rod lenses 11 may be disposed at positions that are equivalent with respect to each of the LED elements 30 each located at one of the positions ES1 and ES2. In other words, the rod lenses 11 may be disposed symmetrically about each of the positions ES1 and ES2. Consequently, the light beam 30L emitted from the LED element 30 located at the position ES1 may be focused by the lens array 1 to form an optical image having a light amount distribution that is symmetrical in the X-axis direction. For example, Part (b) in FIG. 7 illustrates a light amount distribution of an optical image, formed by the lens array 1, of the light beam 30L emitted from the LED element 30 located at the position ES1. In Part (b) in FIG. 7, a horizontal direction of the paper plane represents a light amount I and a vertical direction of the paper plane corresponds to the X-coordinate. A position represented by the X-coordinate in Part (b) in FIG. 7 is coincident with a position represented by the X-coordinate in the drawing in Part (a) in FIG. 7. An optical image, formed by the lens array 1, of the light beam 30L emitted from the LED element 30 located at the position ES2 may also have a light amount distribution that is symmetrical in the X-axis direction.

Referring to FIG. 7, EAS denotes a position of the LED element 30 that is located at a position other than the foregoing positions ES1 and ES2, out of the LED elements 30. In other words, the rod lenses 11 may be disposed asymmetrical about the position EAS in the X-axis direction. Consequently, an optical image, formed by the lens array 1, of the light beam 30L emitted from the LED element 30 located at the position EAS may have a light amount distribution that is asymmetrical in the X-axis direction. For example, Part (c) in FIG. 7 illustrates the light amount distribution of the optical image, formed by the lens array 1, of the light beam 30L emitted from the LED element 30 located at the position EAS. In Part (c) in FIG. 7, a horizontal direction of the paper plane represents the light amount I and a vertical direction of the paper plane corresponds to the X-coordinate. A position represented by the X-coordinate in Part (c) in FIG. 7 is coincident with the position represented by the X-coordinate in the drawing in Part (a) in FIG. 7.

As described above, some of the optical images, formed by the lens array 1, of the light beams 30L emitted from the LED elements 30 may have the symmetrical distribution in the X-axis direction and the others of the optical images, formed by the lens array 1, of the LED elements 30 may have the asymmetrical distribution in the X-axis direction. A density of a formed printed image may be different in some cases between in a case where a dot on the printed image is formed by the image forming apparatus using the optical image having the symmetrical light amount distribution and in a case where the dot on the printed image is formed by the image forming apparatus using the optical image having the asymmetrical light amount distribution, for example. This may lead to occurrence of a streak-form pattern, unevenness of density, or any other phenomenon, deteriorating print quality. It is therefore preferable that the light amount distribution of the optical image formed by the lens array 1 have a higher symmetric property.

Accordingly, the exposure unit 3 according to the present example embodiment may have a configuration that allows a "symmetric property S" described later to fall within a predetermined range. The exposure unit 3 according to the present example embodiment may also have a configuration in which the LED elements 30 and the lens array 1 are so disposed that the distance Lo from the LED elements 30 to the rod lenses 11 is slightly different from a distance LB (a focal distance LB) in which a contrast of the optical image becomes maximum. This configuration allows for formation of a blurred optical image, allowing the light amount distribution of the optical image formed by the lens array 1 to have a higher symmetric property. This is described below in further detail.

Figure 8:
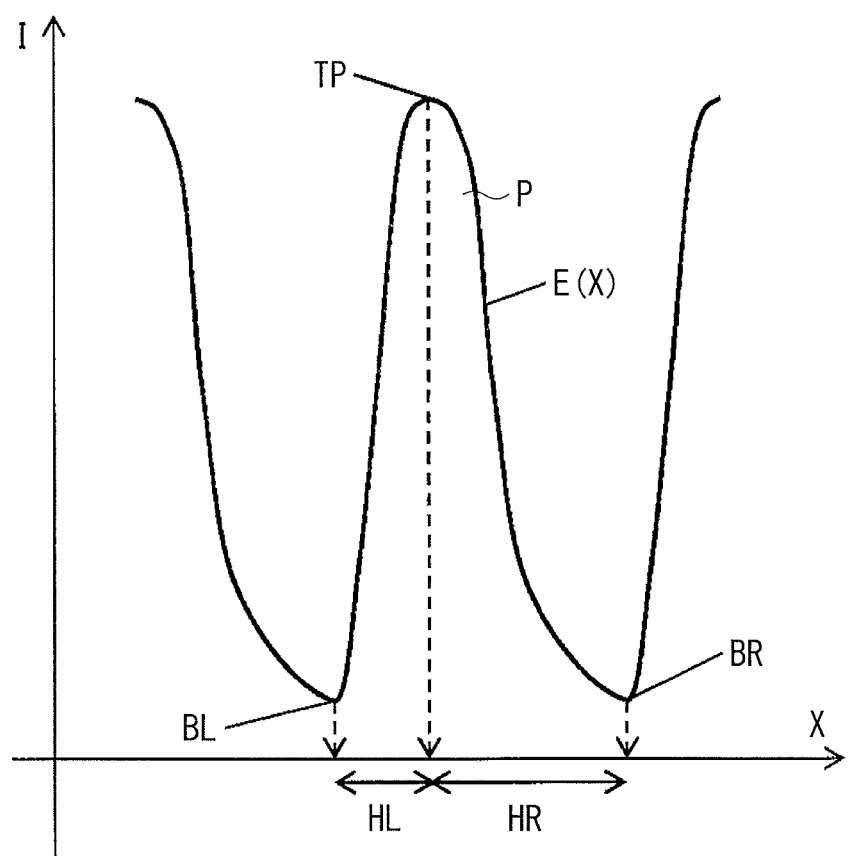
FIG. 8 schematically illustrates an example of the light amount distribution of the optical images formed by the lens array illustrated in FIG. 3.

FIG. 8 schematically illustrates an example of the light amount distribution E(X) of the optical image formed by the lens array 1. In FIG. 8, a horizontal axis represents a position X in the X-axis direction, and a vertical axis represents the light amount I. A plurality of peaks P of the light amount I may be present in the X-axis direction in the light amount distribution E(X) of the optical image formed by the lens array 1, as a result of the arrangement in which the plurality of LED elements 30 are disposed in the X-axis direction with the array pitch PE. Each of the peaks P may correspond to one of the LED elements 30 disposed in the X-axis direction. FIG. 8 illustrates, in an enlarged manner, the vicinity of any of the peaks P of the light amount I. In FIG. 8, TP denotes a local maximum of the peak P, BL denotes one of local minimums of the peak P, and BR denotes the other of the local minimums of the peak P. The symmetric property S is determined as a parameter expressed by the following expression [1], where HL is a difference, in the X-axis direction, between a position of the local maximum TP and a position of the local minimum BL, HR is a difference, in the X-axis direction, between the position of the local maximum TP and a position of the local minimum BR, and XE is a dimension, in the X-axis direction, of the LED element 30 corresponding to the peak P.

$$S=|(HL-HR)/(XE/2)| \quad [1]$$

As expressed by the expression [1], the symmetric property S has a value as a result of dividing a value of a shift amount |HL−HR| from the position of the local maximum TP of the light amount distribution E(X) by a value half of a value of the width XE, in the X-axis direction, of the corresponding LED element 30. The value of the symmetric property S is equal to or greater than 0 (zero). The value 0 (zero) of the symmetric property S corresponds to a fact that the optical image has the light amount distribution symmetrical in the X-axis direction. The greater value of the symmetric property S corresponds to a fact that the optical image has the light amount distribution having a higher asymmetric property, i.e., having a lower symmetric property. Accordingly, it may be desirable that the following expression [2] be satisfied by the symmetric property S related to at least one of the peaks P in the light amount distribution E(X) of the optical image formed by the lens array 1, in the present example embodiment. One reason for this may be that, as described later, such a configuration allows the light amount distribution of the optical image formed by the lens array 1 to have a high symmetric property, making it possible to suppress occurrence of a streak-form pattern, unevenness of density, or any other phenomenon in the printed image due to an exposure amount distribution, in an example case where the exposure unit 3 is applied to an image forming apparatus such as an electronic printer. Further, in terms of suppression of the foregoing occurrence of a streak-form pattern, unevenness of density, or any other phenomenon, it may be further preferable that the following expression [2] be satisfied by an average value of the symmetric properties S determined from the expression [1] for all of the peaks P in the light amount distribution E(X) of the optical image formed by the lens array 1. It may be still further preferable that the following expression [2] be satisfied by all of the symmetric properties S for all of the peaks P in the light amount distribution E(X) of the optical image formed by the lens array 1.

$$0 \leq S \leq 0.65 \quad [2]$$

It may be desirable that the exposure unit 3 satisfy the condition based on the following expression [3] in the present example embodiment.

$$Lo \neq LB \quad [3]$$

where Lo is the distance from the LED elements 30 in the LED array 300 to the end surface 12B of the lens array 1, and LB is the focal distance of the lens array 1 in which a contrast (an MTF value) becomes maximum that is determined from the light amount distribution E(X) in the X-axis direction of the optical image formed by the lens array 1.

Figure 9:
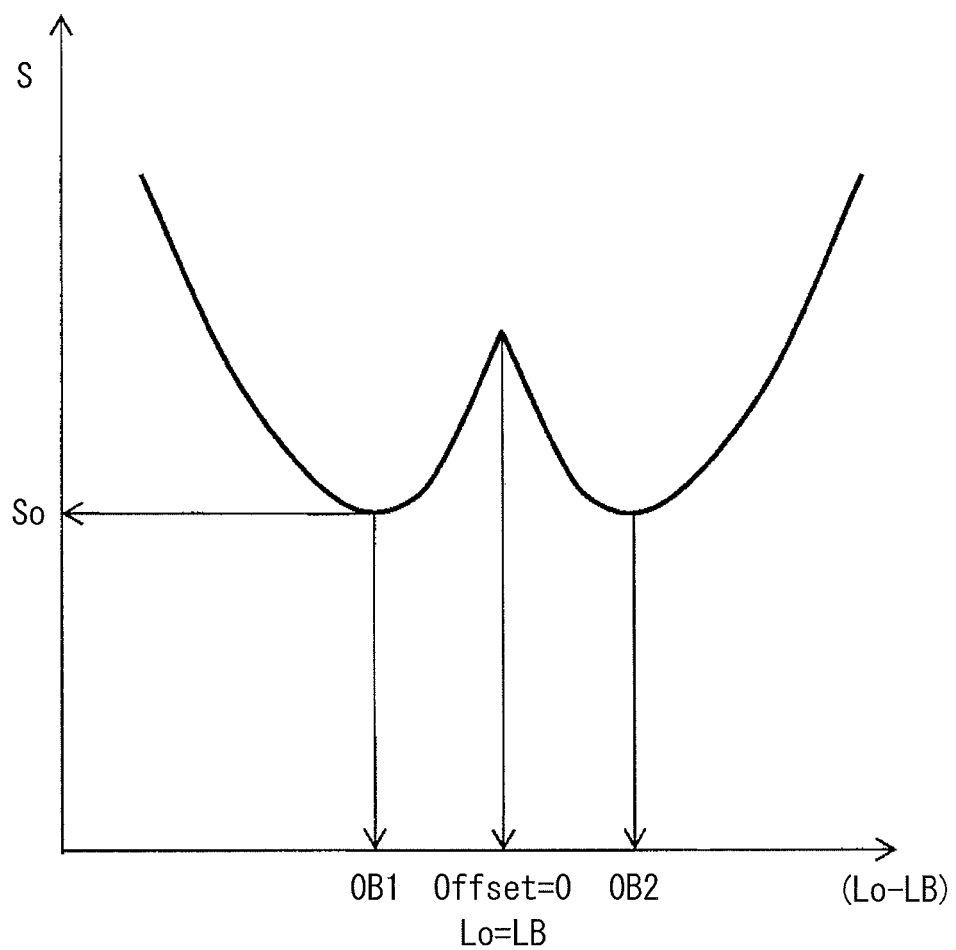
FIG. 9 is a characteristic diagram illustrating an example of a relationship between an offset amount and a symmetric property in the exposure unit illustrated in FIG. 1.

FIG. 9 is a characteristic diagram illustrating a relationship between an offset amount (Lo−LB) and the symmetric property S determined on the basis of the light amount distribution E(X) of the optical image formed by the lens array 1. In FIG. 9, a horizontal axis represents the offset amount (Lo−LB), and a vertical axis represents the symmetric property S determined on the basis of the light amount distribution E(X) illustrated in FIG. 8. Referring to FIG. 9, the symmetric property S may have a local maximum value when the offset amount (Lo−LB) is 0 (zero), i.e., the distance Lo is equal to the focal distance LB (Lo=LB). OB1 is a value that is smaller than 0 (zero) of values of the offset amount (Lo−LB) corresponding to a local minimum value So of the symmetric property S, and OB2 is a value that is greater than 0 (zero) of the values of the offset amount (Lo−LB) corresponding to the local minimum value So of the symmetric property S.

Referring to FIG. 9, two values OB1 and OB2 may be present as the values of the offset amount (Lo−LB) corresponding to the local minimum value So of the symmetric property S for the exposure unit 3 as described above. In the present example embodiment, it may be preferable that the following expression [4] be satisfied.

$$(S/So) \leq 1.3 \quad [4]$$

where So is the local minimum value of the symmetric property S depending on a change in an absolute value OSA (=|Lo−LB|) of the offset amount (Lo−LB).

Figure 10:
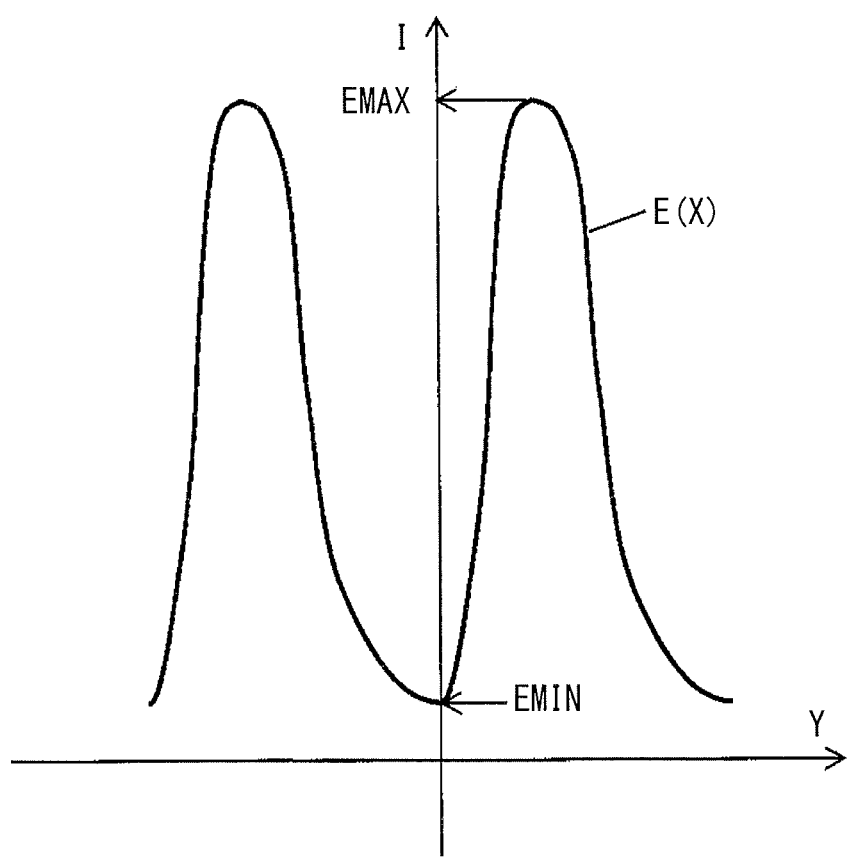
FIG. 10 schematically describes an example of a method of determining an MTF value from the light amount distributions of the optical images formed by the lens array illustrated in FIG. 3.

The MTF value may be determined from the following expression [5] on the basis of the light amount distribution E(X) of the optical image formed by the lens array 1 illustrated in FIG. 10, for example.

$$MTF=\{(EMAX-EMIN)/(EMAX+EMIN)\} \times 100 \quad [5]$$

where EMAX is a local maximum value in the light amount distribution E(X) corresponding to the peak of the optical image derived from the LED element 30 that is emitting a light beam included in the LED array 300, and EMIN is a local minimum value in the light amount distribution E(X) corresponding to a position of another LED element 30 that is emitting no light beam and is adjacent to the LED element 30 that is emitting a light beam.

Figure 11:
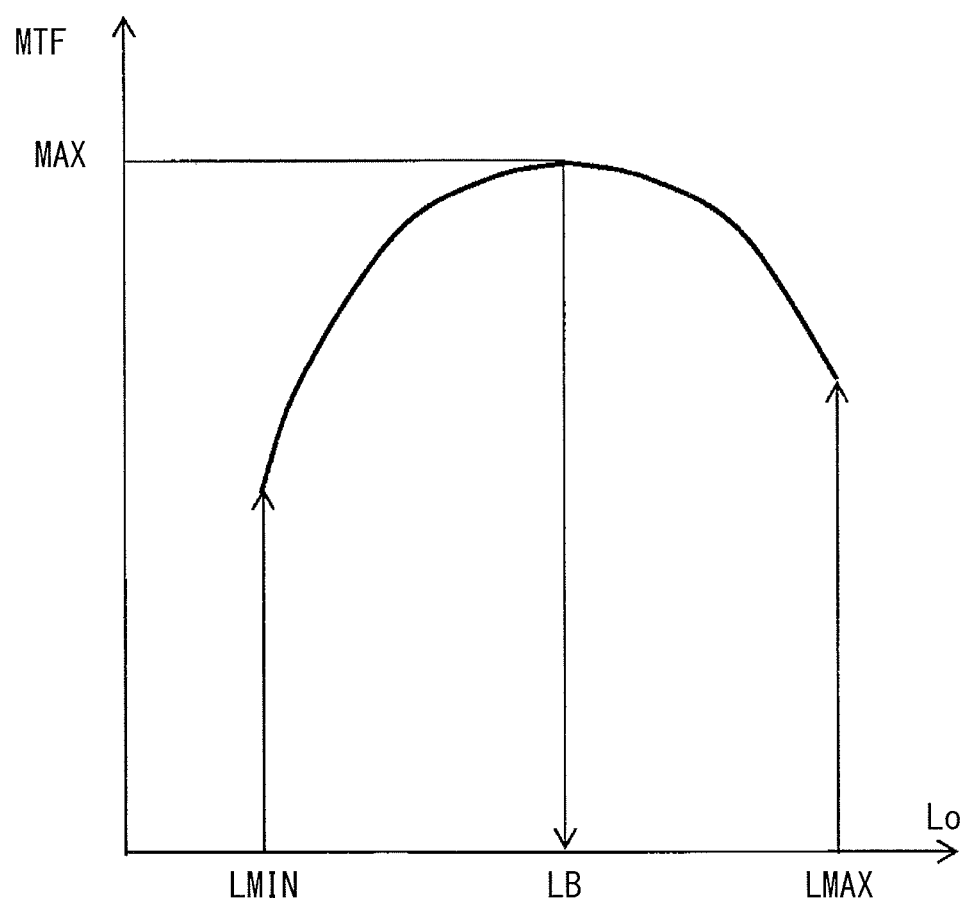
FIG. 11 is a characteristic diagram illustrating an example of a relationship between the MTF value and a distance from the lens array to an LED element.

FIG. 11 is a characteristic diagram illustrating a relationship between the distance Lo and the MTF value. In FIG. 11, a horizontal axis represents the distance Lo, and a vertical axis represents the MTF value determined on the basis of the light amount distribution E(X) illustrated in FIG. 10. Referring to FIG. 11, the MTF value may depend on the distance Lo. The MTF value may have a maximum value when the offset amount (Lo−LB) is 0 (zero), i.e., when the value of the distance Lo is equal to the value of the focal distance LB (Lo=LB), and the MTF value may monotonously decrease when the value of the distance Lo becomes greater or smaller than the value of the focal distance LB.

According to the exposure unit 3 of the present example embodiment, the light amount distribution of the optical image formed by the lens array 1 may so have a higher symmetric property that the expressions [1] to [3] are satisfied. This makes it possible to suppress occurrence of a streak-form pattern, unevenness of density, or any other phenomenon, in the printed image due to an exposure amount distribution, in an example case where the exposure unit 3 is applied to an image forming apparatus such as an electronic printer. This makes it possible to improve print quality.

2. SECOND EXAMPLE EMBODIMENT

[Outline Configuration of Image Forming Apparatus 100]

Figure 12:
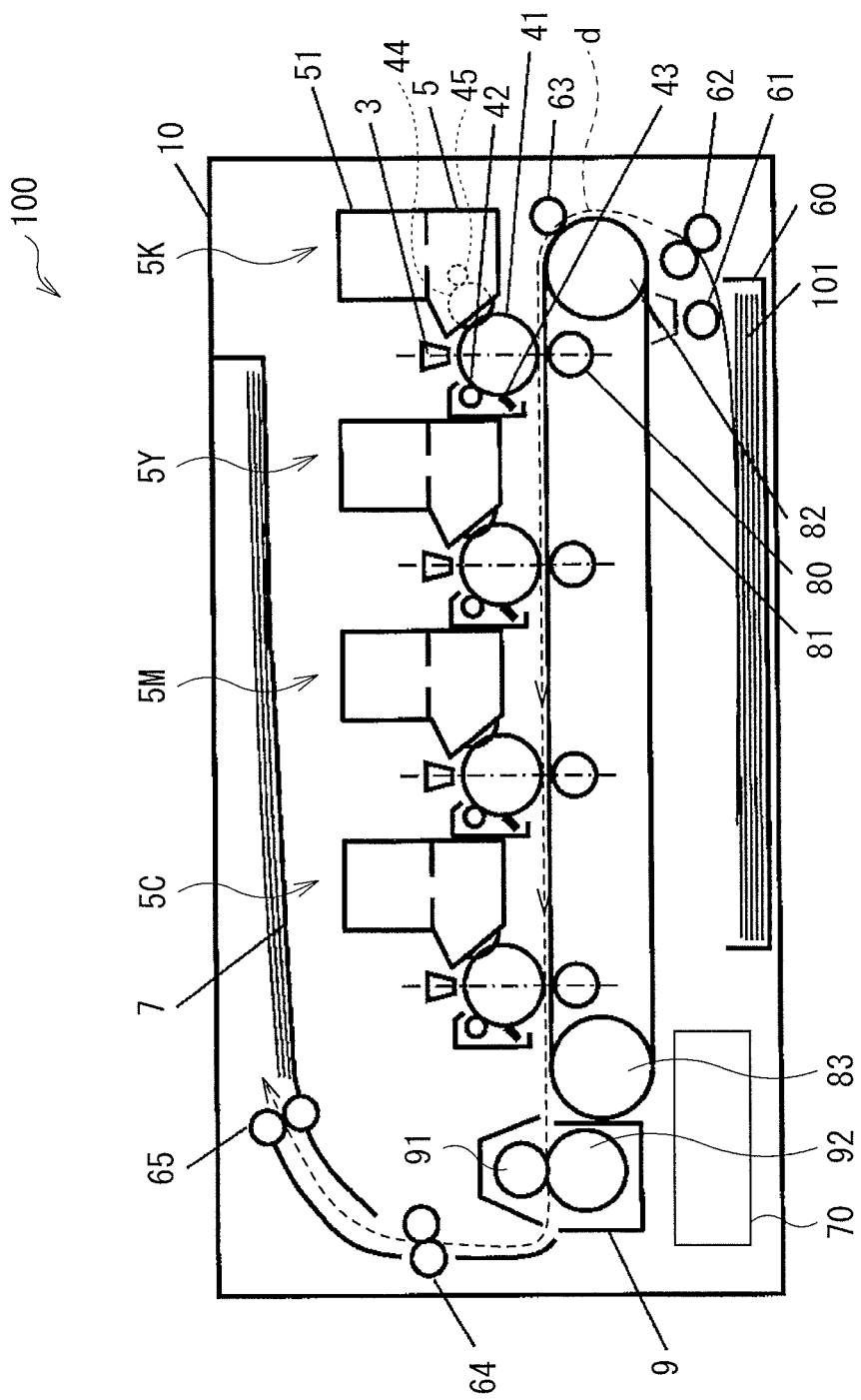
FIG. 12 schematically illustrates an overall configuration example of an image forming apparatus according to one example embodiment of the technology.

FIG. 12 is a schematic view of an overall configuration example of an image forming apparatus 100 according to a second example embodiment of the technology. The image forming apparatus 100 may be a printer using an electrophotographic method that forms an image on a medium 101. The image may be a color image, for example. The medium 101 may be also referred to as a print medium or a transfer member. Non-limiting examples of the medium 101 may include a sheet and a film. The image forming apparatus 100 may correspond to an "image forming apparatus" in one specific but non-limiting embodiment of the technology.

Referring to FIG. 12, the image forming apparatus 100 may include four image forming units 5C, 5M, 5Y, and 5K, a medium feeding cassette 60, a medium feeding roller (a hopping roller) 61, and conveying rollers 62 and 63. The image forming apparatus 100 may further include a transfer roller 80, a transfer belt 81, a transfer belt driving roller 83, a transfer belt driven roller 82, a fixing unit (a fixing apparatus) 9, a conveying roller 64, a discharging roller 65, and a discharging tray 7. The foregoing members may be contained in a predetermined housing 10 including a member such as an unillustrated upper part cover that is openable and closable. The respective image forming units 5C, 5M, 5Y, and 5K may be provided integrally. It may be preferable that the image forming units 5C, 5M, 5Y, and 5K be provided attachably and detachably to the image forming apparatus 100. Further, the image forming apparatus 100 may be provided with an external interface unit built therein and a controller 70. The external interface unit may receive print data from an external apparatus such as a personal computer (PC). The controller 70 may perform an overall operation control of the image forming apparatus 100.

The medium feeding cassette 60 may be a member that contains the media 101 in a stacked state. The medium feeding cassette 60 may be provided attachably and detachably at a lower part of the image forming apparatus 100.

The medium feeding roller 61 may be a member that picks up the media 101 separately one by one from the top of the media 101 contained in the medium feeding cassette 60, and feeds the medium 101 picked up toward the conveying roller 62. In other words, the medium feeding roller 61 may serve a medium feeding mechanism.

Each of the conveying roller 62 and 63 may be a member that sandwiches the medium 101 fed from the medium feeding roller 61 and conveys the medium 101 toward the transfer belt 81 while correcting a skew of the medium 101.

The image forming units 5C, 5M, 5Y, and 5K may be disposed side by side along a conveying path "d" of the medium 101 illustrated by a dashed line in FIG. 12. Specifically, the image forming units 5C, 5M, 5Y, and 5K may be disposed in order from the upstream to the downstream along the conveying path "d". It is to be noted that the conveying path "d" may be a path having a shape of a letter "S" as a whole in this example as illustrated in FIG. 12. The image forming units 5C, 5M, 5Y, and 5K may each correspond to an "image forming unit" in one specific but non-limiting embodiment of the technology.

The respective image forming units 5C, 5M, 5Y, and 5K may form images (toner images) on a recording medium using different colors of toner (developers). Specifically, the image forming unit 5C may form a cyan toner image using cyan (C) toner. Similarly, the image forming unit 5M may form a magenta toner image using magenta (M) toner. The image forming unit 5Y may form a yellow toner image using yellow (Y) toner. The image forming unit 5K may form a black toner image using black (K) toner.

The foregoing toner of each of the colors may include agents such as a predetermined coloring agent, a predetermined release agent, a predetermined electric charge control agent, and a predetermined treatment agent, for example. Components of the respective agents described above may be mixed as appropriate or subjected to a surface treatment to produce the toner. The coloring agent, the release agent, and the electric charge control agent out of the foregoing agents may serve as internal additives. Further, an additive such as silica and titanium oxide may be included as an external additive, and a resin such as polyester resin may be included as a binding resin. As the coloring agent, an agent such as a dye and a pigment may be used solely, or a plurality of agents such as a dye and a pigment may be used in combination.

The image forming units 5C, 5M, 5Y, and 5K may have the same configuration except that the colors of the toner used to form the toner images (the developer images) are different from each other as described above. Hence, the configuration of the image forming units 5C, 5M, 5Y, and 5K is described below referring to the configuration of the image forming unit 5K as a representative example.

Referring to FIG. 12, the image forming unit 5K may include a toner cartridge 51 (a developer container), the photosensitive drum 41 (an image supporting member), an electrically-charging roller 42 (an electrically-charging member), a developing roller 44 (a developer supporting member), a feeding roller 45 (a feeding member), a cleaning blade 43, and the exposure unit 3.

The toner cartridge 51 may be a container that contains the foregoing toner of each of the colors. Specifically, the toner cartridge 51 in the image forming unit 5K may contain the black toner, for example. Similarly, the toner cartridge 51 in the image forming unit 5M may contain the magenta toner. The toner cartridge 51 in the image forming unit 5Y may contain the yellow toner. The toner cartridge 51 in the image forming unit 5C may contain the cyan toner. The photosensitive drum 41 may be a member that has a surface (a surficial part) supporting an electrostatic latent image thereon. The photosensitive drum 41 may include a photosensitive body such as an organic photosensitive body. Specifically, the photosensitive drum 41 may include an electrically-conductive supporting body and a photoconductive layer that covers a circumferential part (a surface) of the electrically-conductive supporting body. The electrically-conductive supporting body may include a metal pipe made of aluminum, for example. The photoconductive layer may have a structure including an electric charge generation layer and an electric charge transfer layer that are stacked in order, for example. It is to be noted that the foregoing photosensitive drum 41 may rotate at a predetermined circumferential velocity.

The electrically-charging roller 42 may be a member that electrically charges the surface (the surficial part) of the photosensitive drum 41. The electrically-charging roller 42 may be so disposed as to be in contact with a surface (a circumferential part) of the photosensitive drum 41. The electrically-charging roller 42 may include a metal shaft and an electrically-semiconductive rubber layer that covers a circumferential part (a surface) of the metal shaft, for example. Non-limiting examples of the electrically-semiconductive rubber layer may include an electrically-semiconductive epichlorohydrin rubber layer. It is to be noted that the electrically-charging roller 42 may rotate in a direction opposite to the rotation direction of the photosensitive drum 41, for example.

The developing roller 44 may be a member that has a surface supporting thereon toner to develop the electrostatic latent image. The developing roller 44 may be so disposed as to be in contact with the surface (the circumferential surface) of the photosensitive drum 41. The developing roller 44 may include a metal shaft and an electrically-semiconductive urethane rubber layer that covers a circumferential part (a surface) of the metal shaft. It is to be noted that the foregoing developing roller 44 may rotate in a direction opposite to the rotation direction of the photosensitive drum 41 at a predetermined circumferential velocity, for example.

The feeding roller 45 may be a member that feeds the toner contained inside the toner cartridge 51 to the developing roller 44. The feeding roller 45 may be so disposed as to be in contact with a surface (a circumferential surface) of the developing roller 44. The feeding roller 45 may include a metal shaft and a foamable silicone rubber layer that covers a circumferential part (a surface) of the metal shaft, for example. It is to be noted that the feeding roller 45 may rotate in a direction same as the rotation direction of the developing roller 44, for example.

The cleaning blade 43 may be a member that scrapes the toner remained on the surface (the surficial part) of the photosensitive drum 41 to thereby remove the remained toner from the surface (the surficial part) of the photosensitive drum 41. In other words, the cleaning blade 43 may be a member that cleans the surface (the surficial part) of the photosensitive drum 41. The cleaning blade 43 may be so disposed as to be in contact with the surface of the photosensitive drum 41 in a counter direction. In other words, the cleaning blade 43 may be so disposed as to protrude in a direction opposite to the rotation direction of the photosensitive drum 41. The cleaning blade 43 may be made of an elastic material such as polyurethane rubber, for example.

The exposure unit 3 may be the one described above according to the first example embodiment. The exposure unit 3 may selectively apply application light onto the surface of the photosensitive drum 41 that has been electrically charged by the electrically-charging roller 42, on the basis of the image data. The exposure unit 3 may thus expose the surface of the photosensitive drum 41, and thereby form an electrostatic latent image on the surface (the surficial part) of the photosensitive drum 41. The exposure unit 3 may be supported by the housing 10, for example.

The transfer belt 81 may be an endless belt that electrostatically absorbs the medium 101 conveyed by members such as the conveying roller 62, to thereby convey the medium 101 along the conveying path "d". The transfer belt driving roller 83 and the transfer belt driven roller 82 may each be a member that causes the transfer belt 81 to perform a rotation operation.

The transfer roller 80 may be a member that electrostatically transfers, on the medium 101, the toner image formed inside each of the image forming units 5C, 5M, 5Y, and 5K. The transfer roller 80 may be so disposed as to face each of the photosensitive drums 41 in the respective image forming units 5C, 5M, 5Y, and 5K with the transfer belt 81 in between. It is to be noted that the transfer roller 80 may be made of a foamed electrically-semiconductive elastic rubber material, for example.

The fixing unit 9 may be a unit that applies heat and pressure to the toner (the toner image) on the medium 101 conveyed from the transfer belt 81, and thereby fixes the toner image onto the medium 101. The fixing unit 9 may include a heating unit 91 and a pressurizing roller 92 that are so disposed as to face each other with the conveying path "d" of the medium 101 in between, for example. It is to be noted that the fixing unit 9 may be provided integrally with the image forming apparatus 100, or may be attachably and detachably attached to the image forming apparatus 100, for example.

The conveying roller 64 and the discharging roller 65 may each be a guiding member that guides the medium 101 when the medium 101 onto which the toner is fixed by the fixing unit 9 is to be discharged to outside of the image forming apparatus 100. The medium 101 that has been guided by the conveying roller 64 and the discharging roller 65 in order and discharged to the outside of the housing 10 may be discharged, in a face-down state, toward the discharging tray 7 provided at the upper part of the housing 10. It is to be noted that the discharging tray 7 may be a part in which the media 101 on each which an image is formed (printed) are accumulated.

[Operation and Workings]
(A. Basic Operation)

The image forming apparatus 100 may transfer the toner image onto the medium 101 in the following manner. In other words, the image forming apparatus 100 may have a configuration in which a printing operation is performed in the following manner.

When the print image data and printing order are supplied from an external device such as a PC to the controller 70 in the image forming apparatus 100 in an operating state, the controller 70 may start the printing operation of the print image data according to the printing order.

For example, referring to FIG. 12, the media 101 contained in the medium feeding cassette 60 may be picked up one by one from the top by the medium feeding roller 61. The medium 101 picked up may be conveyed by members such as the conveying rollers 62 and 63 while a skew of the medium 101 is corrected by the members such as conveying rollers 62 and 63. The medium 101 may be thus conveyed to the image forming units 5C, 5M, 5Y, and 5K provided downstream from the conveying rollers 62 and 63. The toner image may be transferred onto the medium 101 in the following manner in each of the image forming units 5C, 5M, 5Y, and 5K.

In each of the image forming units 5C, 5M, 5Y, and 5K, the toner image of each of the colors may be formed through the following electrophotographic process according to the printing order given by the controller 70. Specifically, the controller 70 may activate a driver to cause the photosensitive drum 41 to rotate in a predetermined rotation direction at a constant velocity. In accordance with the rotation of the photosensitive drum 41, the members such as the electrically-charging roller 42, the developing roller 44, and the feeding roller 45 may each start a rotation operation in a predetermined direction.

The controller 70 may apply a predetermined voltage to the electrically-charging roller 42 for each of the colors, to thereby electrically charge the surface of the photosensitive drum 41 for each of the colors uniformly. Thereafter, the controller 70 may supply a control signal to the exposure unit 3 to thereby activate the exposure unit 3. The activated exposure unit 3 may apply light beams corresponding to the respective color components of the print image based on the image data onto the respective photosensitive drums 41 of the respective colors, thereby forming the electrostatic latent images on the surfaces 41S of the photosensitive drums 41 for the respective colors. Specifically, each of the LED elements 30 may emit a light beam having a predetermined light amount on the basis of the control signal supplied from the controller 70. Referring to FIG. 3, the light beam emitted from each of the LED elements 30 may enter the lens array 1. The light beam that has entered the lens array 1 may be focused on the surface 41S of the photosensitive drum 41 to form an optical image.

The toner contained inside the toner cartridge 51 may be fed to the developing roller 44 via the feeding roller 45. The fed toner may be supported by the surface of the developing roller 44. The developing roller 44 may attach the toner to the electrostatic latent image formed on the photosensitive drum 41 to thereby form the toner image. Further, the transfer roller 80 may receive a voltage, leading to generation of an electric field between the photosensitive drum 41 and the transfer roller 80. When the medium 101 is passed between the photosensitive drum 41 and the transfer roller 80 in such a state, the toner image formed on the photosensitive drum 41 may be transferred onto the medium 101.

Thereafter, the toner images on the medium 101 may be applied with heat and pressure by the fixing unit 9, to be thereby fixed onto the medium 101. Finally, the medium 101 onto which the toner images are fixed may be discharged, by the conveying roller 64 and the discharging roller 65, to the discharging tray 7 to be stocked in the discharging tray 7. This may bring the printing operation performed on the medium 101 to the end.

(B. Workings and Effects of Exposure Unit 3)

The image forming apparatus 100 includes the exposure unit 3 described above according to the first example embodiment. This makes it possible to sufficiently suppress a bias in the exposure amount distribution with respect to the photosensitive drum 41. Accordingly, it is possible to obtain a printed image with a reduced streak-form pattern, decreased unevenness of a density, or any other phenomenon reduced due to the exposure amount distribution of the exposure unit 3, making it possible to improve print quality.

The exposure unit 3, the image forming units 5C, 5M, 5Y, and 5K, and the image forming apparatus 100 of the respective example embodiments of the technology each have the configuration in which the expressions [1] to [3] are satisfied. This configuration ensures the favorable symmetric property S of the light amount distribution of the light beam focused by the lens array 1, allowing for reduction of an unintentional bias in the exposure amount distribution, for example, with respect to the photosensitive drum 41.

According to the exposure unit 3, the image forming units 5C, 5M, 5Y, and 5K, and the image forming apparatus 100 of the respective example embodiments of the technology, it is possible to perform suitable exposure, and to thereby form an image with improved quality.

3. EXAMPLES

Examples 1-1 to 1-6

Figure 13:
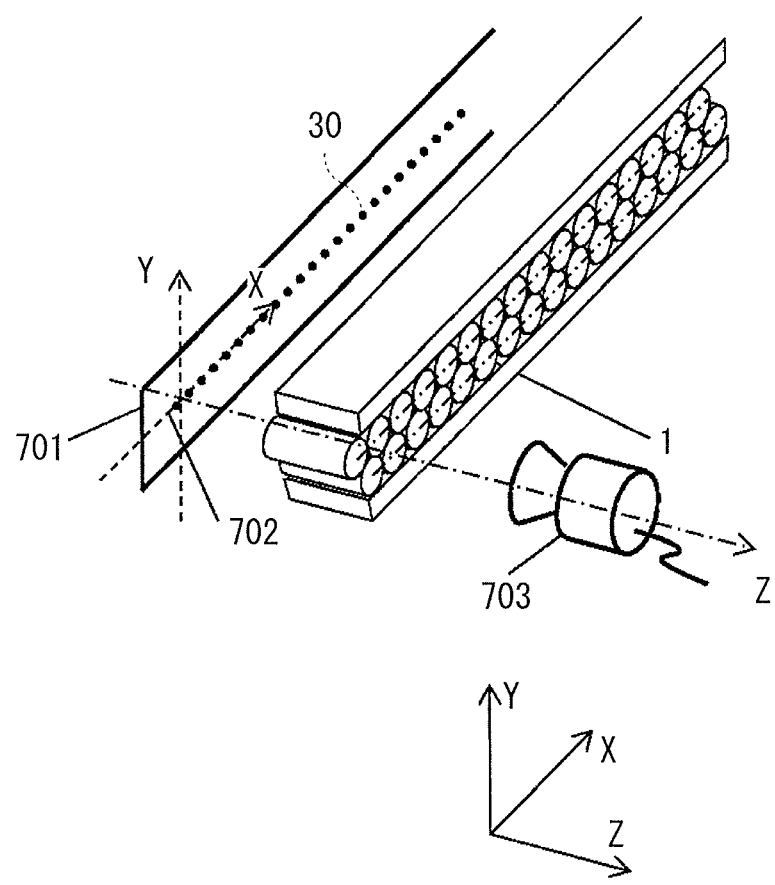
FIG. 13 is a perspective view of an example of a key part of a focal distance measuring apparatus.

The lens array 1 described in the foregoing example embodiments was fabricated to measure the MTF value and the symmetric property S for the light amount distribution of the optical image formed by the lens array 1. A focal distance measuring apparatus 700 illustrated in FIGS. 13 and 14 was used to measure the MTF value and the symmetric property S in Examples 1-1 to 1-6. FIG. 13 is a perspective view of a key part of the focal distance measuring apparatus 700, and FIG. 14 is a side view of the key part of the focal distance measuring apparatus 700 viewed from its side.

Figure 14:
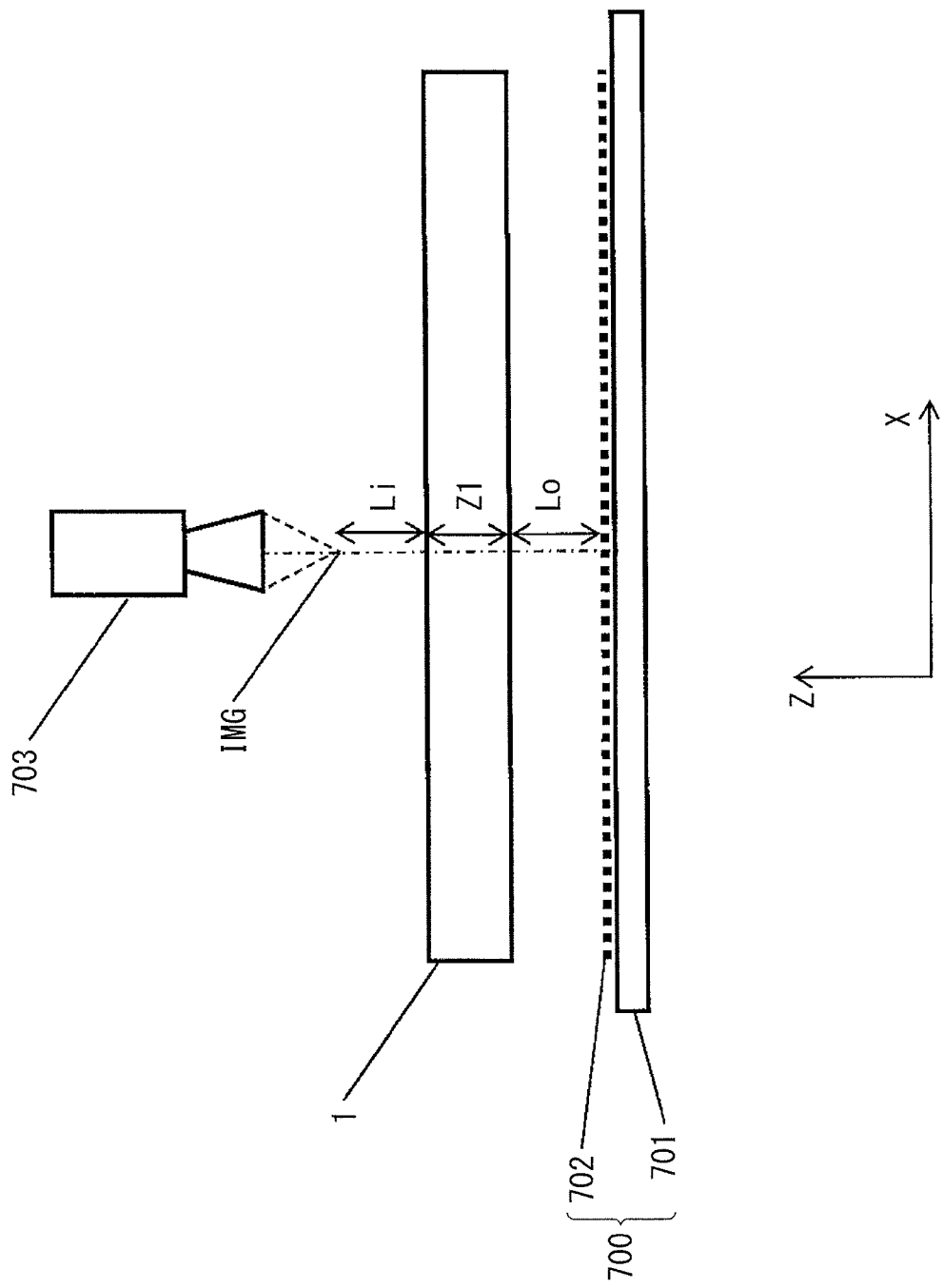
FIG. 14 is a side view of an example of the key part of the focal distance measuring apparatus.

Referring to FIGS. 13 and 14, the focal distance measuring apparatus 700 had a configuration in which the lens array 1 to be examined was to be disposed between a LED array 702 and a camera 703. The LED array 702 included a circuit board 701 and the LED elements 30 disposed on the circuit board 701 in a line in the X-axis direction. The camera 703 captured the optical image formed by the lens array 1. The LED array 702, the lens array 1, and the camera 703 were disposed side by side in order in the Z-axis direction. The camera 703 was able to perform scanning in the X-axis direction in which the LED elements 30 were disposed. The lens array 1 was movable in the X-axis direction to a position out of a field of view of the camera 703. The lens array 1 and the camera 703 were movable in the Z-axis direction independently of each other.

Referring to FIG. 14, the focal distance measuring apparatus 700 had a configuration in which a longitudinal direction of the lens array 1 and a direction in which the LED elements 30 in the LED array 702 were disposed both corresponded to the X-axis direction, and were substantially parallel to each other. The LED array 702 and the lens array 1 were disposed with a spacing of the distance Lo in between. The lens array 1 was movable in both the X-axis direction and the Z-axis direction. In FIG. 14, IMG denotes a focal point position (an optical image forming position) of the camera 703. The focal point position IMG and the lens array 1 were provided with a spacing of the distance Li in between in the Z-axis direction. The camera 703 was also movable in both the X-axis direction and the Z-axis direction.

The followings are the respective dimensions of the LED elements 30 included in the LED array 702. The array pitch PE was 42 μm, the width XE was 21 μm, and the length YE was 21 μm. The width XP of the tip end 361 of the electrode 36 was 5 μm. The resolution of the LED array 702 was 600 dpi, and the central value of the light-emission wavelength of the LED element 30 was 770 nm. Each of the rod lenses 11 included in the lens array 1 in each of the Examples had a radius from 0.14 mm to 0.16 mm. The rod lenses 11 had substantially the same characteristics in a refractive index distribution. The height Z1 of the lens array 1 was as described in Table 1. The height Z1 was measured with a tool such as a dial gauge. Table 1 also describes the focal distance LB of the lens array 1.

TABLE 1

|  | Height Z1 [mm] | Focal distance LB [mm] |
| --- | --- | --- |
| Example 1-1 | 4.394 | 2.201 |
| Example 1-2 | 4.379 | 2.298 |
| Example 1-3 | 4.369 | 2.369 |
| Example 1-4 | 4.290 | 2.785 |
| Example 1-5 | 4.252 | 2.910 |
| Example 1-6 | 4.111 | 3.815 |

Figure 15:
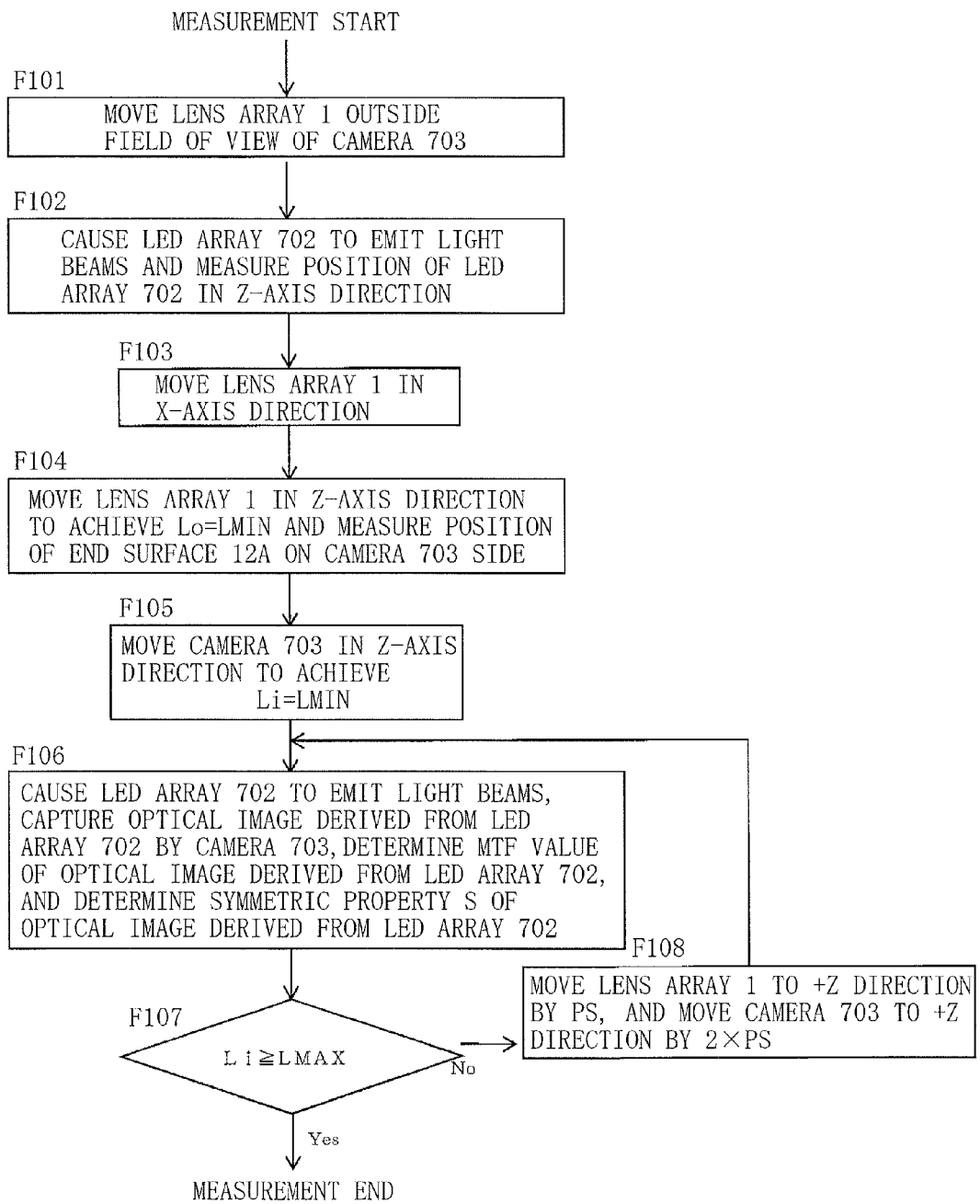
FIG. 15 is a flowchart describing an example of a method of measuring the MTF value and the symmetric property with the focal distance measuring apparatus illustrated in FIGS. 13 and 14.

Referring to a flowchart illustrated in FIG. 15, a method of measuring the MTF value and the symmetric property S using the focal distance measuring apparatus 700 is described below.

First, the lens array 1 was so moved in the X-axis direction as to be located outside the field of view of the camera 703 (step F101). Thereafter, the LED elements 30 in the LED array 702 were caused to emit light beams, and a position of the LED array 702 in the Z-axis direction was measured by the camera 703 (step F102). Thereafter, the lens array 1 was so moved in the X-axis direction that an optical image derived from the LED array 702 was formed by the lens array 1, and that the end surface 12A of the lens array 1 was located at a position capturable by the camera 703 (step F103). Thereafter, the lens array 1 was so moved in the Z-axis direction that the distance Lo was equal to LMIN (Lo=LMIN), and a position of the end surface 12A of the lens array 1 in the Z-axis direction was measured by the camera 703 (step F104). Thereafter, the camera 703 was so moved in the Z-axis direction that the distance Li was equal to LMIN (Li=LMIN) (step F105). Thereafter, the LED elements 30 in the LED array 702 were alternately caused to emit light beams. The optical image derived from the LED array 702 that was formed by the lens array 1 was captured by the camera 703. Further, the MTF value and the symmetric property S were each determined on the basis of the light amount distribution of the optical image derived from the LED array 702 (step F106). The focal distance LB was also determined. The method of determining each of the MTF value, the symmetric property S, and the focal distance LB was as described above. After determining the MTF value and the symmetric property S, a determination was made as to whether a value of the distance Li was equal to or greater than LMAX (step F107). When the value of the distance Li was smaller than LMAX (No in step F107), the lens array 1 was moved in a plus direction of the Z-axis direction by a distance PS, and the camera 703 was moved to the plus direction of the Z-axis direction by a distance (2×PS) of twice as much as the distance PS (step F108). Thereafter, the processing in step F106 was performed again. In contrast, when the value of the distance Li was equal to or greater than LMAX (Yes in step F107), the measurement performed by the focal distance measuring apparatus 700 was terminated. In the measurement performed in Examples 1-1 to 1-6, LMIN was about −0.25 mm of the focal distance LB of the lens array 1, LMAX was about +0.25 mm of the focal distance LB of the lens array 1, and the distance PS was 0.01 mm.

The position of the LED array 702 in the Z-axis direction and the measurement of the position of the lens array 1 in the Z-axis direction were measured by the focal distance measuring apparatus 700 as described below with reference to FIGS. 16A and 16B.

Figure 16A:
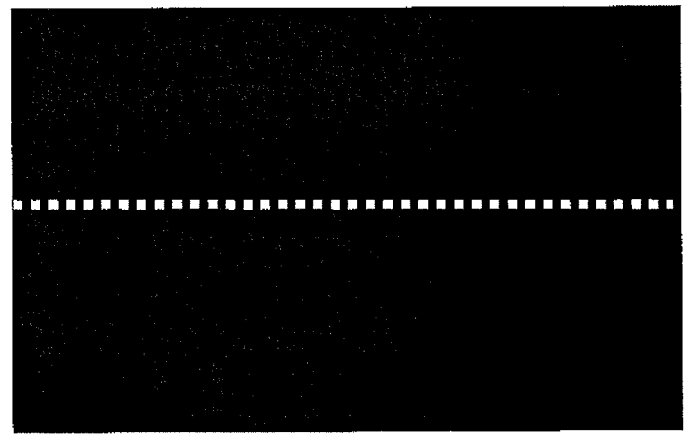
FIG. 16A is a captured image of an LED array captured by the focal distance measuring apparatus illustrated in FIGS. 13 and 14.
Figure 16B:
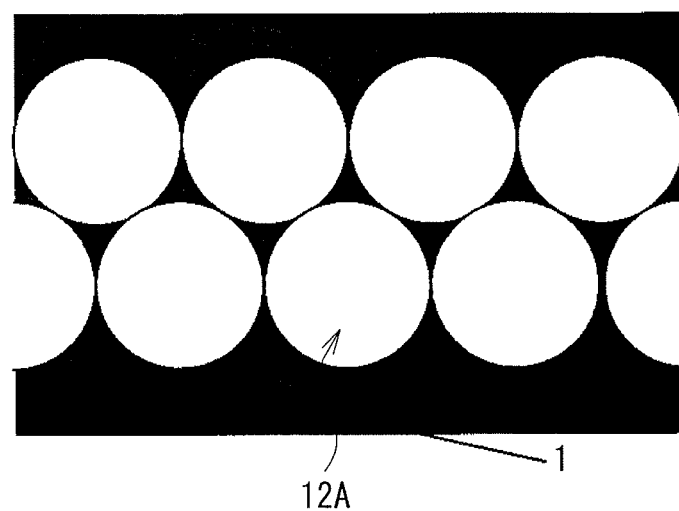
FIG. 16B is a captured image of an end surface of the lens array captured by the focal distance measuring apparatus illustrated in FIGS. 13 and 14.
Figure 17A:
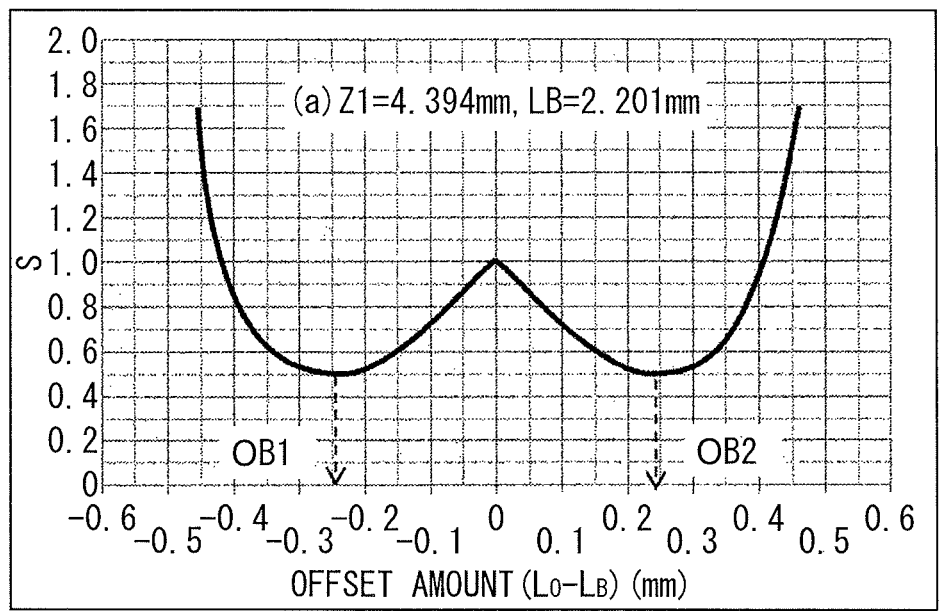
FIG. 17A is a characteristic diagram illustrating a relationship between a symmetric property determined by the focal distance measuring apparatus and an offset amount for a lens array according to Example 1-1.
Figure 17B:
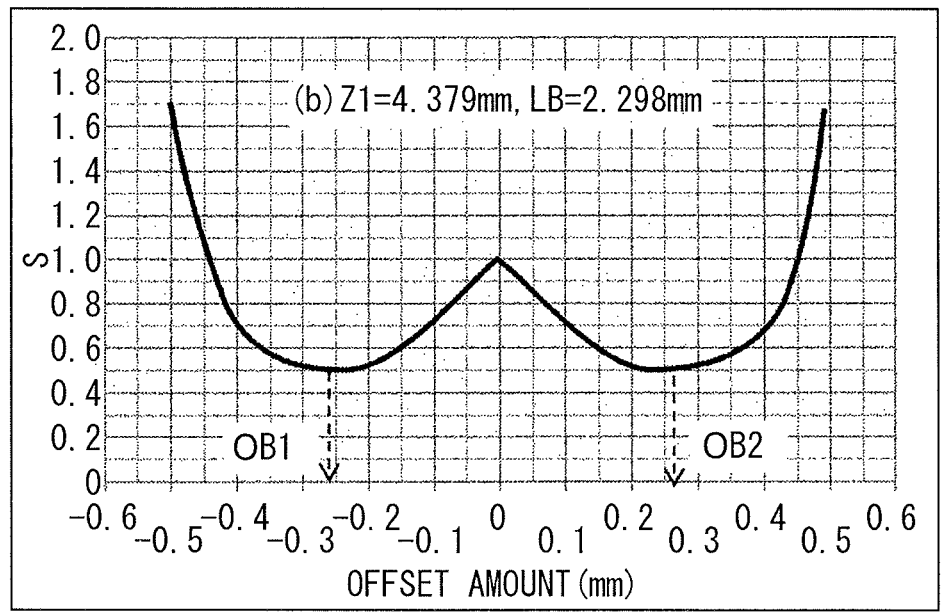
FIG. 17B is a characteristic diagram illustrating a relationship between a symmetric property determined by the focal distance measuring apparatus and an offset amount for a lens array according to Example 1-2.
Figure 17C:
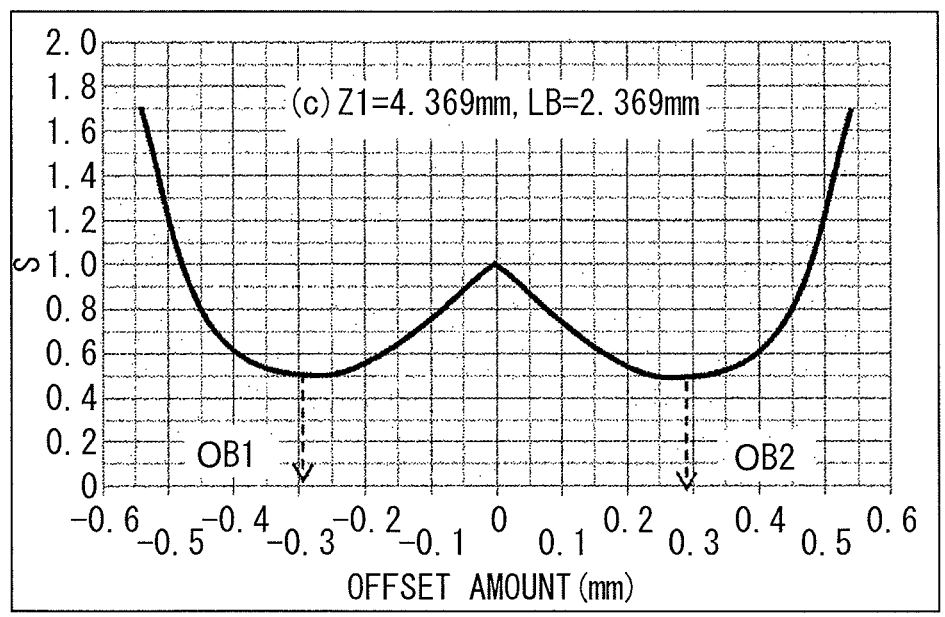
FIG. 17C is a characteristic diagram illustrating a relationship between a symmetric property determined by the focal distance measuring apparatus and an offset amount for a lens array according to Example 1-3.
Figure 17D:
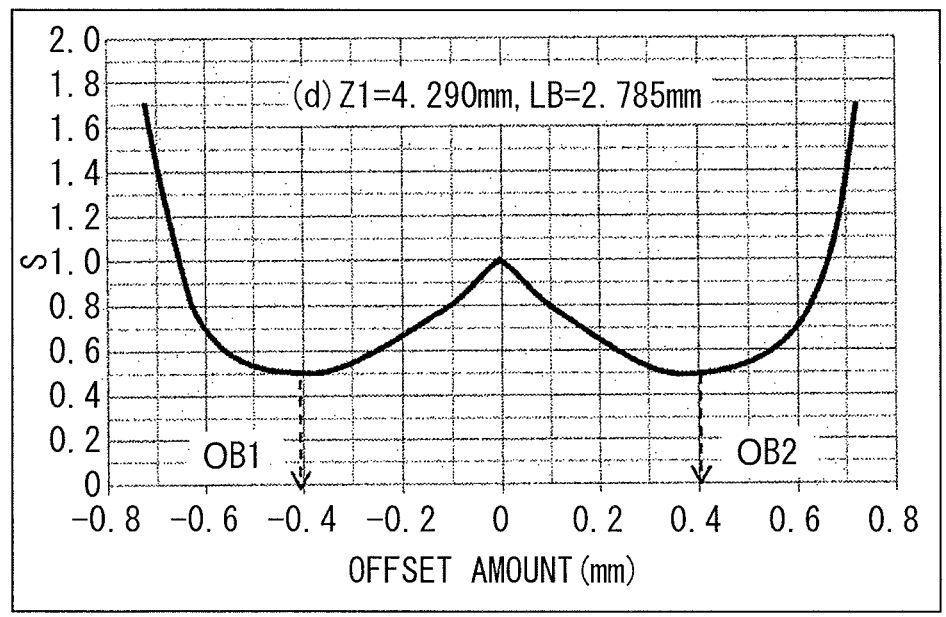
FIG. 17D is a characteristic diagram illustrating a relationship between a symmetric property determined by the focal distance measuring apparatus and an offset amount for a lens array according to Example 1-4.
Figure 17E:
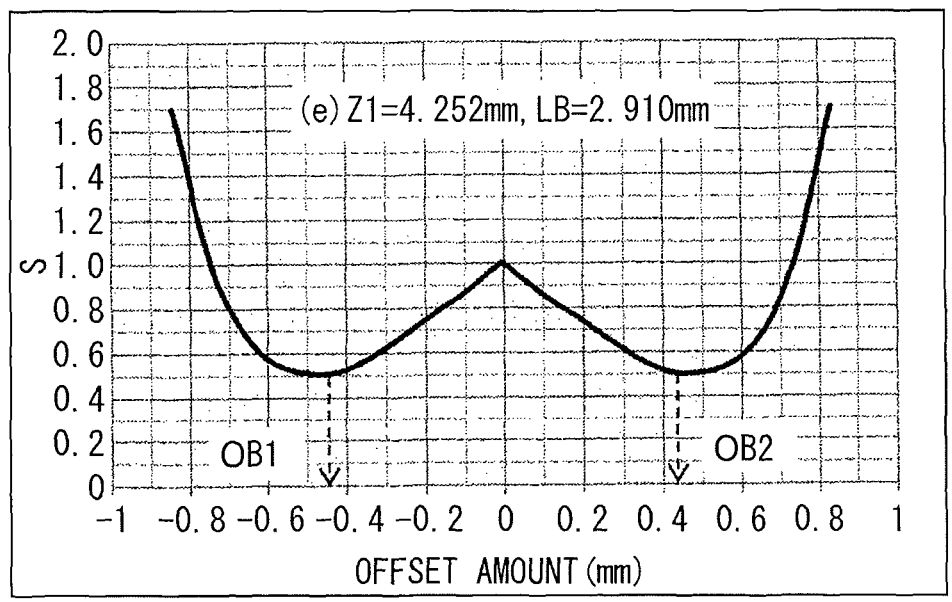
FIG. 17E is a characteristic diagram illustrating a relationship between a symmetric property determined by the focal distance measuring apparatus and an offset amount for a lens array according to Example 1-5.
Figure 17F:
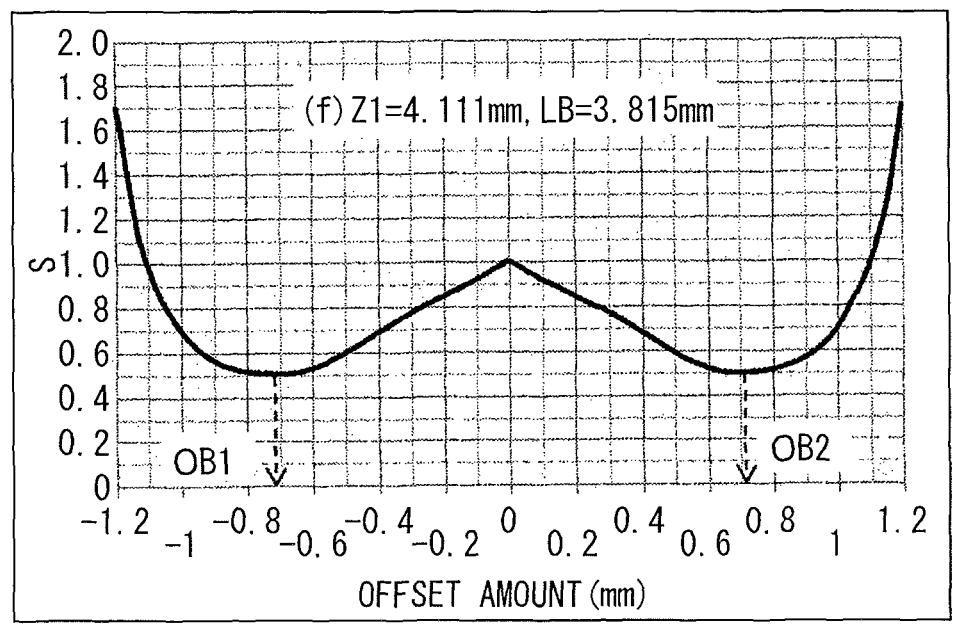
FIG. 17F is a characteristic diagram illustrating a relationship between a symmetric property determined by the focal distance measuring apparatus and an offset amount for a lens array according to Example 1-6.

FIG. 16A illustrates an image of the LED array 702 captured by the camera 703. The LED array 702 was caused to emit light beams, and the images of the LED array 702 were captured by the camera 703 while moving the camera 703 in the Z-axis direction. A difference in luminance was determined for every pair of adjacent pixels in each of the captured images. The sum of absolute values of the respective differences was determined for each of the captured images. As a result, a Z-coordinate of the focal point position IMG of the camera 703 at which the sum of the absolute values was largest of all of the captured images corresponded to the position of the LED array 702 in the Z-axis direction. FIG. 16B illustrates the image, of the end surface 12A of the lens array 1, captured by the camera 703. Images of the end surface 12A were captured by the camera 703 while moving the camera 703 in the Z-axis direction. A difference in luminance was determined for every pair of adjacent pixels in each of the captured images. The sum of absolute values of the respective differences was determined for each of the captured images. As a result, the Z-coordinate of the focal point position IMG of the camera 703 at which the sum of the absolute values was largest of all of the captured images corresponded to the position of the end surface 12A in the Z-axis direction, i.e., the position of the lens array 1 in the Z-axis direction.

FIGS. 17A to 17F each illustrate a relationship between the symmetric property S and the offset amount determined by the focal distance measuring apparatus 700 for corresponding one of the lens arrays 1 according to the respective Examples 1-1 to 1-6. An increase in the offset amount corresponds to an increase in distance from the lens array 1, and a decrease in the offset amount corresponds to a decrease in distance from the lens array 1. The symmetric property S of each of the lens arrays 1 refers to an averaged value of symmetric properties measured for a number of optical images formed by the lens array 1.

Figure 18:
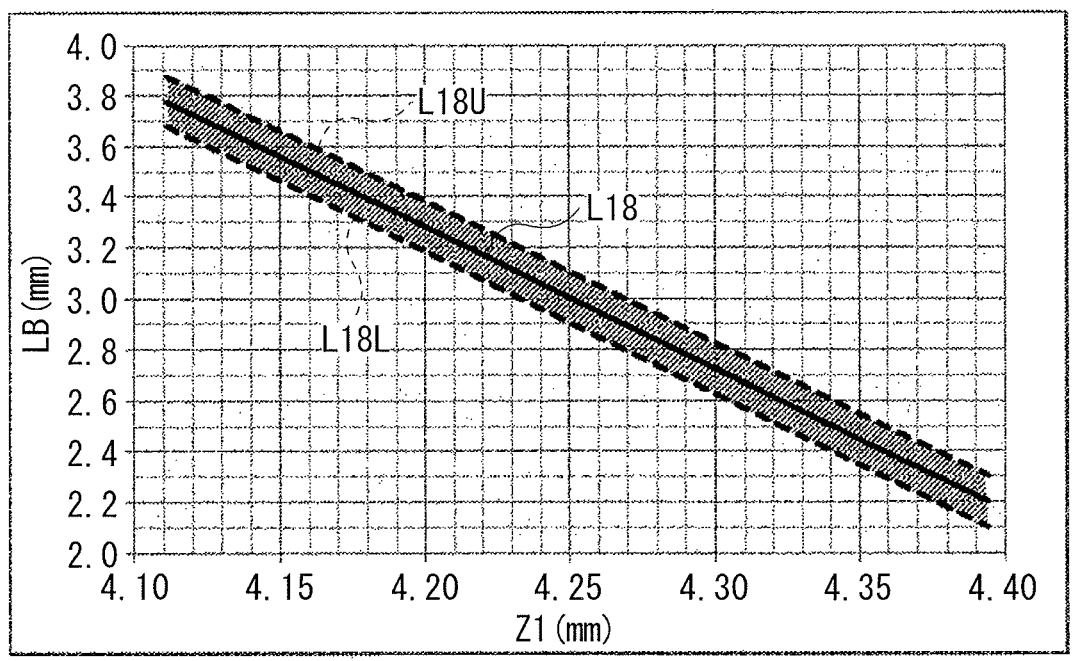
FIG. 18 is a characteristic diagram illustrating a relationship between a height and a focal distance for each of the lens arrays according to the respective Examples 1-1 to 1-6.

A solid line L18 in FIG. 18 represents a relationship between the height Z1 (mm) and the focal distance LB (mm) for each of the lens arrays 1 according to the respective Examples 1-1 to 1-6. A shaded region between two dashed lines L18U and L18L sandwiching the solid line L18 in FIG. 18 includes plotted relationships between the height Z1 and the focal distance LB for a plurality of lens arrays fabricated under the same conditions as those of the lens arrays 1 according to the respective Examples 1-1 to 1-6. The presence of such a region in FIG. 18 reflects the variations in refractive index distribution between the lens parts 14 in the respective rod lenses 11. In other words, the lens array 1 included in the region between the dashed line L18U and the dashed line L18L has the optical characteristics substantially the same as those of the lens arrays 1 according to the respective Examples 1-1 to 1-6, and also has the relationship between the offset amount and the symmetric property S substantially the same as those of the lens arrays 1 according to the respective Examples 1-1 to 1-6. Accordingly, a printed image obtained using the lens array 1 included in the region between the dashed line L18U and the dashed line L18L has a tendency of print quality substantially the same as that of the printed image obtained using any of the lens arrays 1 according to the respective Examples 1-1 to 1-6. The dashed line L18L and the dashed line L18U may be approximated to the following expressions [6] and [7], respectively.

$$LB = -5.57 \times Z1 + 26.6 \quad [6]$$

$$LB = -5.57 \times Z1 + 26.8 \quad [7]$$

On the basis of the expressions [6] and [7], a lens array that satisfies the following expression [8] has a refractive index distribution substantially the same as that of the lens arrays 1 according to the respective Examples 1-1 to 1-6, and also has a relationship between the offset amount and the symmetric property S substantially the same as that of the lens arrays 1 according to the respective Examples 1-1 to 1-6. Accordingly, the lens array that satisfies the following expression [8] has a tendency of print quality similar to that of the lens arrays 1 according to the respective Examples 1-1 to 1-6.

$$26.6 \leq LB + 5.57 \times Z1 \leq 26.8 \quad [8]$$

The exposure unit 3 including any one of the lens arrays 1 according to the respective Examples 1-1 to 1-6 was mounted on the image forming apparatus 100. A printed image was formed with the foregoing image forming apparatus 100 to evaluate the quality of the printed image. It is to be noted that, before forming the printed image, all of the LED elements 30 included in the LED array 702 were so subjected to light amount correction that the light amounts of the light beams traveling from all of the LED elements 30 to the lens array 1 were substantially the same with each other.

Figure 19:
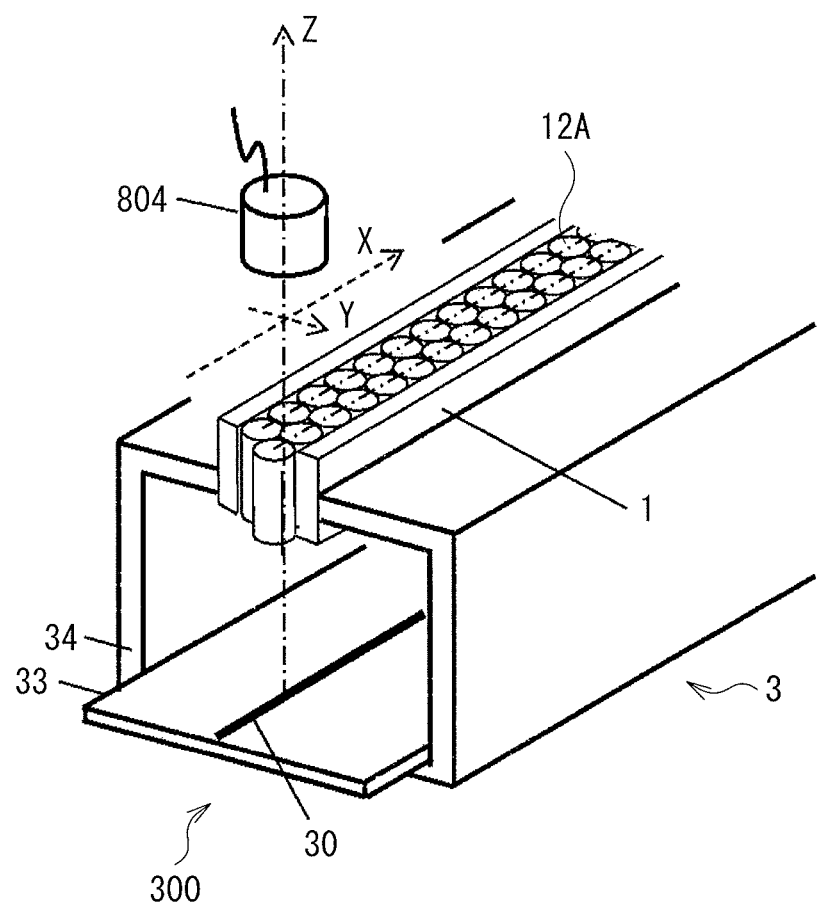
FIG. 19 is a perspective view of a key part of an optical image measuring device.
Figure 20:
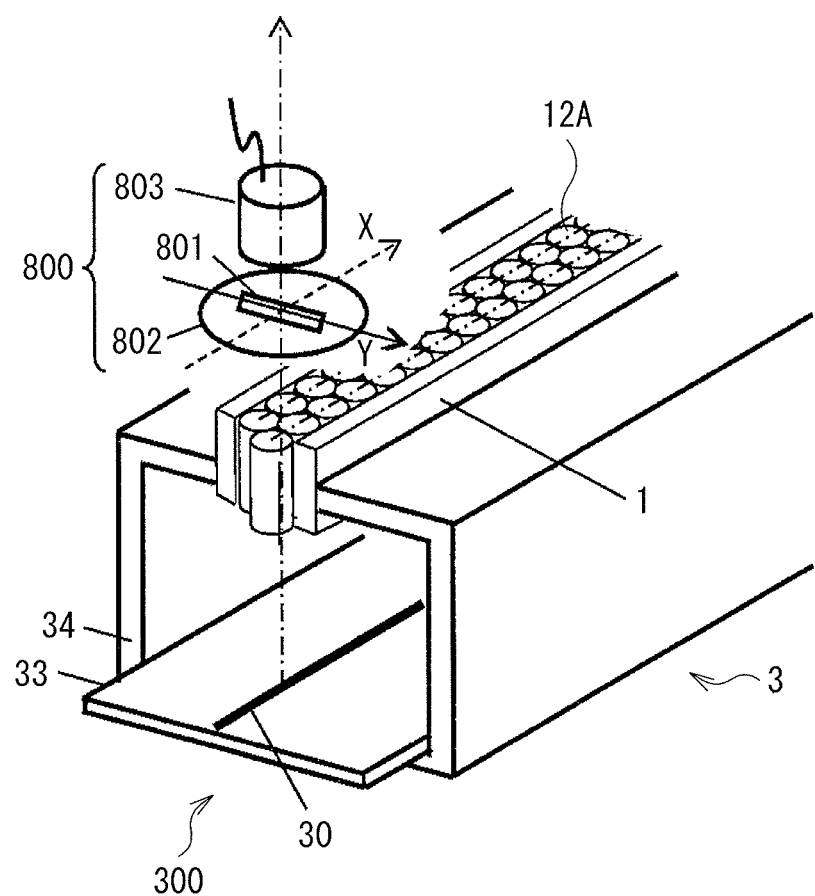
FIG. 20 is a perspective view of a key part of another optical image measuring device.

Upon subjecting all of the LED elements 30 to the foregoing light amount correction, the light amount distribution of the optical image formed by the lens array 1 was measured by optical image measuring devices illustrated in FIGS. 19 and 20.

The optical image measuring device illustrated in FIG. 19 included a photosensor 804 that faced the end surface 12A of the lens array 1 in the exposure unit 3 that was to be subjected to the measurement. The foregoing optical image measuring device measured, for each of the LED elements 30, the light amount of the optical image at a position away from the end surface 12A of the lens array 1 by the distance Li. Specifically, while the photosensor 804 performed scanning in a longitudinal direction (an X-axis direction) of the exposure unit 3, the light amount distribution of the optical image formed by the lens array 1 was measured by the photosensor 804 at a position at which the position of the photosensor 804 in the X-axis direction was coincident with a position of the LED element 30 emitting a light beam and was to be subjected to the measurement.

The optical image measuring device illustrated in FIG. 20 had a configuration similar to that of the optical image measuring device illustrated in FIG. 19 in which the photosensor 804 was replaced by a slit sensor 800. The slit sensor 800 included a photosensor 803 and a light shielding plate 802. The photosensor 803 was so disposed as to face the end surface 12A of the lens array 1. The light shielding plate 802 had a slit 801 and was disposed between the photosensor 803 and the lens array 1. The slit 801 extended in a Y-axis direction orthogonal to the X-axis direction in which the LED elements 30 were disposed, as illustrated in FIG. 20. The light beam that was emitted from the LED element 30 to be transmitted by the lens array 1 passed through the slit 801 to enter the photosensor 803, being converted into an electric signal. The optical image measuring device illustrated in FIG. 20 had a configuration in which, while the photosensor 803 performed scanning in the longitudinal direction (the X-axis direction) of the exposure unit 3, the light amount distribution of the optical image formed by the lens array 1 was measured by the photosensor 803 at a position at which the position of the photosensor 803 in the X-axis direction was coincident with the position of the LED element 30 emitting a light beam and to be subjected to the measurement.

A description is given below of a procedure of the light amount correction performed on the LED elements 30 with the optical image measuring devices illustrated in FIGS. 19 and 20, with reference to a flowchart illustrated in FIG. 21.

First, the LED elements 30 in the LED array 300 were caused to emit light beams on a one dot basis using a current having a constant value to measure, by the photosensor 804, light amounts of the light beams emitted from the respective LED elements 30 (step F201). Thereafter, a current value for each of the LED elements 30 that allowed the light amount to be the same between all of the LED elements 30 was determined on the basis of values of the light amounts measured for all of the LED elements 30 in step F201. The determined current value was referred to as a light amount correction value. Thereafter, the LED elements 30 were caused to emit light beams on a one dot basis with a current having the determined light amount correction value, and a slit waveform of each of the LED elements 30 was measured by the slit sensor 800 (step F202). The slit waveform was a waveform of the optical image derived from the LED element 30. A current value for each of the LED elements 30 that allowed the area of a cross-section of the slit waveform to be the same between all of the LED elements 30 on the basis of the slit waveforms measured in step F202 (step F203). The determined current value was referred to as a slit correction value. Thereafter, the determined slit correction value was written into a read-only memory (ROM) in the exposure unit 3 (step F204).

Figure 21:
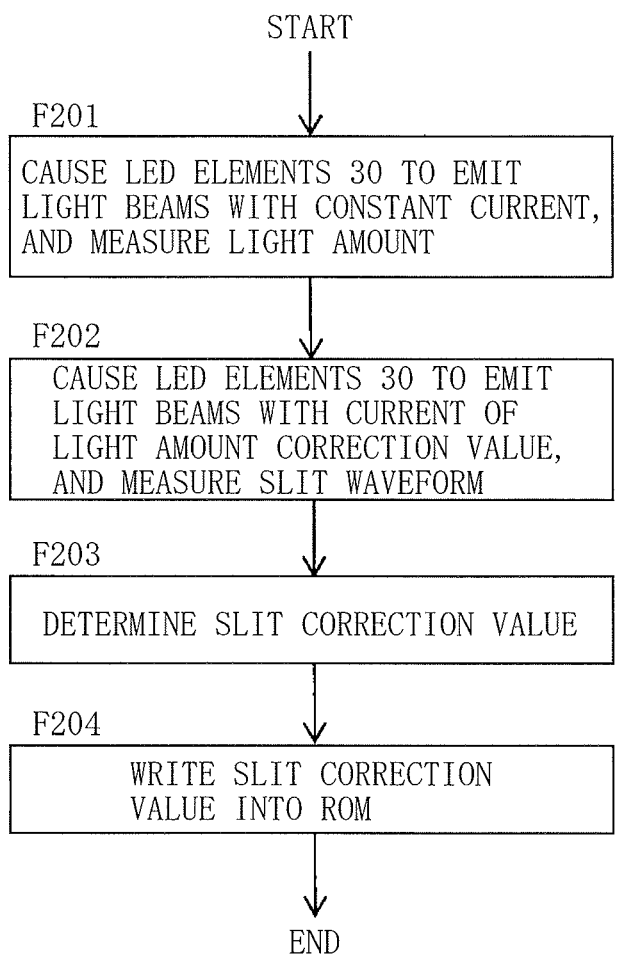
FIG. 21 is a flowchart describing a procedure of light amount correction performed on an LED element by the optical image measuring devices illustrated in FIGS. 19 and 20.
Figure 22A:
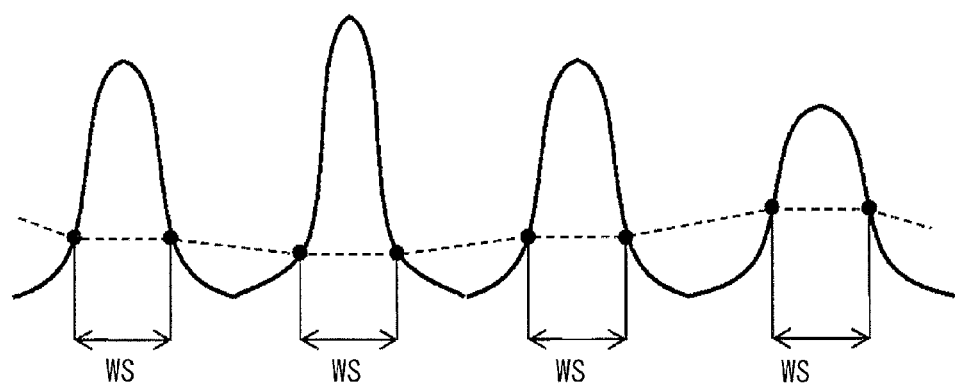
FIG. 22A illustrates a slit waveform, of an optical image derived from the LED element, determined by the optical image measuring device illustrated in FIG. 19.
Figure 22B:
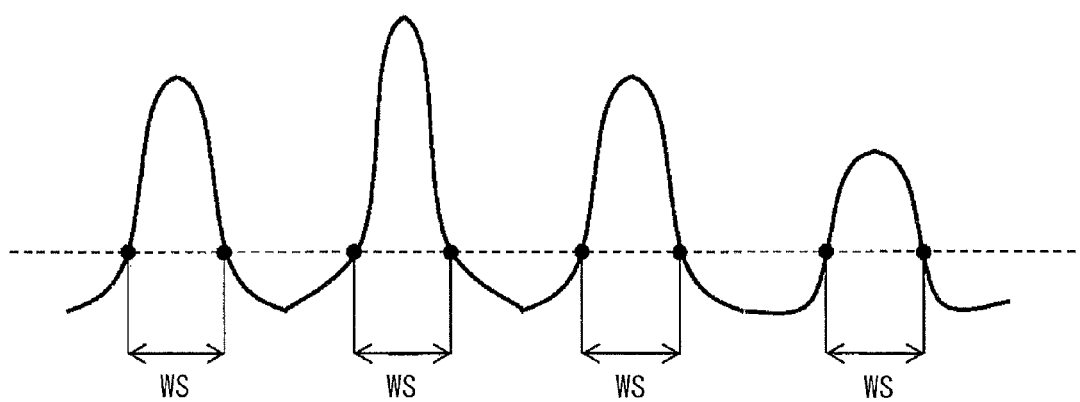
FIG. 22B illustrates a corrected slit waveform, of the optical image derived from the LED element, determined by the optical image measuring device illustrated in FIG. 20.

FIG. 22A illustrates the slit waveforms that are the waveforms of the optical images derived from the LED elements 30 that were measured in step F202 in the flowchart illustrated in FIG. 21. The respective LED elements 30 were so controlled on the basis of the light amount correction value that the LED elements 30 had the same light amount. Referring to FIG. 22A, the height of the waveform corresponding to a width WS varied between the slit waveforms. FIG. 22B illustrates a method of determining the slit correction value that was determined in step F203 in the flowchart illustrated in FIG. 21. The slit correction value was a current value for each of the LED elements 30 that was so set that the height of the waveform corresponding to the width WS was the same between the slit waveforms. For the exposure unit 3 in the present Examples, the slit correction value was so determined that the height of the waveform corresponding to the width WS, of the slit waveform, of 60 µm was the same between the slit waveforms.

After performing the forgoing light amount correction, the exposure unit 3 including any one of the lens arrays 1 according to the respective Examples 1-1 to 1-6 was mounted on the image forming apparatus 100. A printed image was formed with the foregoing image forming apparatus 100 to evaluate the quality of the formed printed image. Print evaluation is described below with reference to FIGS. 23A to 23C.

Upon the print evaluation, the image forming apparatus 100 with the exposure unit 3 having resolution of 600 dpi was used. In Examples 1-1 to 1-6, the following three types of printed images illustrated in FIGS. 23A to 23C were printed: the printed image illustrated in FIG. 23A which was formed by causing the LED elements 30 to emit light beams alternately on a two dot basis; the printed image illustrated in FIG. 23B which included fine lines in the Y-axis direction in which the medium 101 was to be conveyed; and the printed image illustrated in FIG. 23C which included fine lines in the X-axis direction in which the LED elements 30 were disposed. Out of the foregoing printed images, a printed image in which a vertical streak, unevenness of density, or any other phenomenon was not confirmed was determined as "good". Specifically, a result of evaluation of a printed image in a case where both the distance Lo from the lens array 1 to the LED elements 30 and the distance Li from the lens array 1 to the photosensitive drum 41 were equal to the focal distance LB was used as a reference and indicated by a white triangle (Δ). A result of the evaluation that was more favorable than the reference was determined as "good" and is indicated by a white circle (○). A result of the evaluation that was less favorable than the reference was determined as "poor". Tables 2 to 7 each describe the results of the evaluation. It is to be noted that, in Tables 2 to 7, an increase in the offset amount (Lo−LB) corresponds to an increase in distance from the lens array 1, and a decrease in the offset amount (Lo−LB) corresponds to a decrease in distance from the lens array 1.

TABLE 2

(Example 1-1) Height Z1 = 4.394 [mm], Focal distance LB = 2.201 [mm]

| | Offset amount [mm] | | | | | | | | |
|---|---|---|---|---|---|---|---|---|---|
| | −0.40 | −0.36 | −0.24 (OB1) | −0.12 | 0.00 | 0.12 | 0.24 (OB2) | 0.36 | 0.40 |
| \|HL-HR\| [µm] | 8.9 | 6.8 | 5.3 | 6.8 | 10.5 | 6.8 | 5.3 | 6.8 | 8.9 |
| Symmetric property S | 0.85 | 0.65 | 0.50 | 0.65 | 1.00 | 0.65 | 0.50 | 0.65 | 0.85 |
| Print evaluation | Δ | ◯ | ◯ | ◯ | Δ | ◯ | ◯ | ◯ | Δ |

TABLE 3

(Example 1-2) Height Z1 = 4.379 [mm], Focal distance LB = 2.298 [mm]

| | Offset amount [mm] | | | | | | | | |
|---|---|---|---|---|---|---|---|---|---|
| | −0.45 | −0.40 | −0.27 (OB1) | −0.14 | 0.00 | 0.14 | 0.27 (OB2) | 0.40 | 0.45 |
| \|HL-HR\| [µm] | 10.5 | 6.8 | 5.3 | 6.8 | 10.5 | 6.8 | 5.3 | 6.8 | 10.5 |
| Symmetric property S | 1.00 | 0.65 | 0.50 | 0.65 | 1.00 | 0.65 | 0.50 | 0.65 | 1.00 |
| Print evaluation | Δ | ◯ | ◯ | ◯ | Δ | ◯ | ◯ | ◯ | Δ |

TABLE 4

(Example 1-3) Height Z1 = 4.369 [mm], Focal distance LB = 2.369 [mm]

| | Offset amount [mm] | | | | | | | | |
|---|---|---|---|---|---|---|---|---|---|
| | −0.45 | −0.43 | −0.29 (OB1) | −0.15 | 0.00 | 0.15 | 0.29 (OB2) | 0.43 | 0.45 |
| \|HL-HR\| [µm] | 8.9 | 6.8 | 5.3 | 6.8 | 10.5 | 6.8 | 5.3 | 6.8 | 8.9 |
| Symmetric property S | 0.85 | 0.65 | 0.50 | 0.65 | 1.00 | 0.65 | 0.50 | 0.65 | 0.85 |
| Print evaluation | Δ | ◯ | ◯ | ◯ | Δ | ◯ | ◯ | ◯ | Δ |

TABLE 5

(Example 1-4 Height Z1 = 4.290 [mm], Focal distance LB = 2.785 [mm]

| | Offset amount [mm] | | | | | | | | |
|---|---|---|---|---|---|---|---|---|---|
| | −0.65 | −0.60 | −0.41 (OB1) | −0.22 | 0 | 0.22 | 0.41 (OB2) | 0.60 | 0.65 |
| \|HL-HR\| [µm] | 10.5 | 6.8 | 5.3 | 6.8 | 10.5 | 6.8 | 5.3 | 6.8 | 10.5 |
| Symmetric property S | 1.00 | 0.65 | 0.50 | 0.65 | 1.00 | 0.65 | 0.50 | 0.65 | 1.00 |
| Print evaluation | Δ | ◯ | ◯ | ◯ | Δ | ◯ | ◯ | ◯ | Δ |

TABLE 6

(Example 1-5) Height Z1 = 4.252 [mm], Focal distance LB = 2.910 [mm]

| | Offset amount [mm] | | | | | | | | |
|---|---|---|---|---|---|---|---|---|---|
| | −0.75 | −0.64 | −0.44 (OB1) | −0.24 | 0.00 | 0.24 | 0.44 (OB2) | 0.64 | 0.75 |
| \|HL-HR\| [µm] | 10.5 | 6.8 | 5.3 | 6.8 | 10.5 | 6.8 | 5.3 | 6.8 | 10.5 |
| Symmetric property S | 1.00 | 0.65 | 0.50 | 0.65 | 1.00 | 0.65 | 0.50 | 0.65 | 1.00 |
| Print evaluation | Δ | ◯ | ◯ | ◯ | Δ | ◯ | ◯ | ◯ | Δ |

TABLE 7

(Example 1-6) Height Z1 = 4.111 [mm], Focal distance LB = 3.815 [mm]

| | | | Offset amount [mm] | | | | | | |
|---|---|---|---|---|---|---|---|---|---|
| | −1.1 | −1.02 | −0.72 (OB1) | −0.42 | 0 | 0.42 | 0.72 (OB2) | 1.02 | 1.1 |
| \|HL−HR\| [μm] | 10.5 | 6.8 | 5.3 | 6.8 | 10.5 | 6.8 | 5.3 | 6.8 | 10.5 |
| Symmetric property S | 1 | 0.65 | 0.5 | 0.65 | 1 | 0.65 | 0.5 | 0.65 | 1 |
| Print evaluation | Δ | ○ | ○ | ○ | Δ | ○ | ○ | ○ | Δ |

Figure 23A:
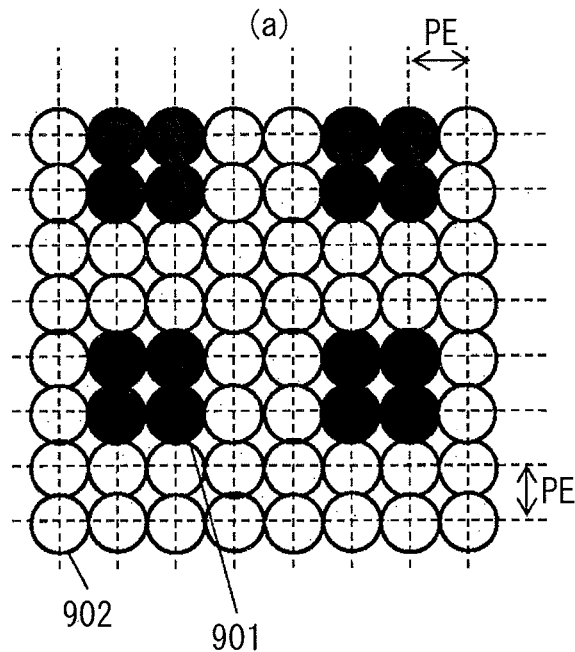
FIG. 23A illustrates a first example of a printed image used for evaluation of each of the lens arrays according to the respective Examples 1-1 to 1-6.
Figure 23B:
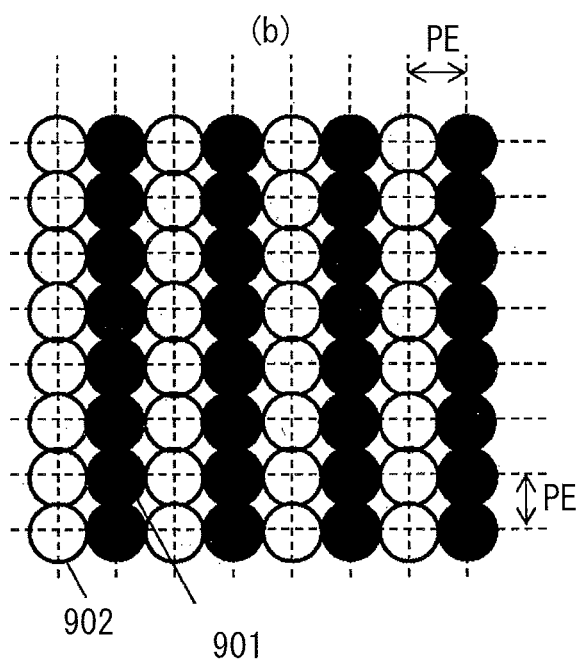
FIG. 23B illustrates a second example of the printed image used for the evaluation of each of the lens arrays according to the respective Examples 1-1 to 1-6.
Figure 23C:
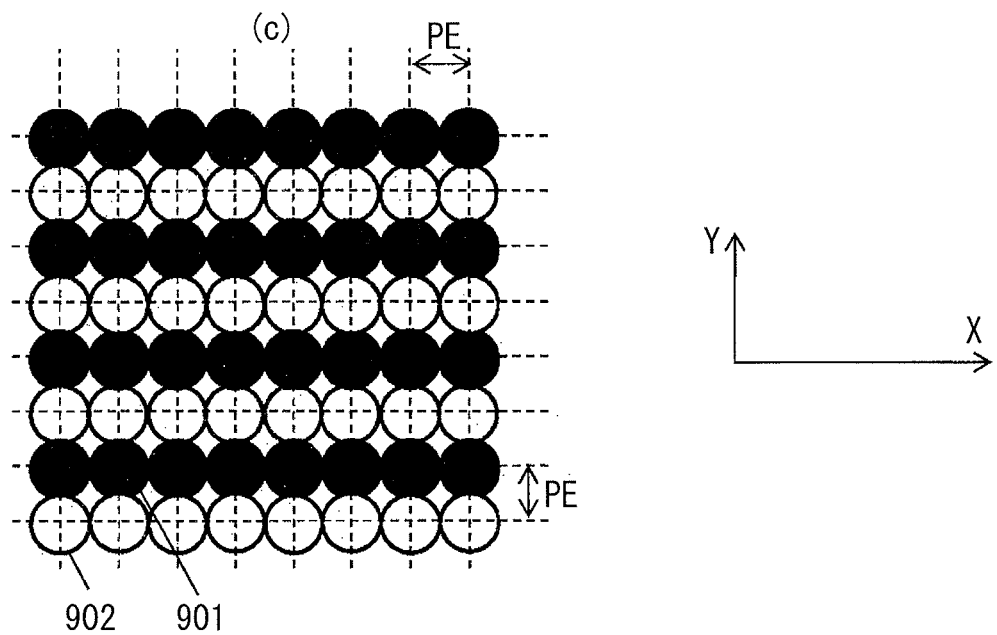
FIG. 23C illustrates a third example of the printed image used for the evaluation of each of the lens arrays according to the respective Examples 1-1 to 1-6.

It is to be noted that, in FIGS. 23A to 23C, a black dot denoted with numeral 901 represents the LED element 30 that is emitting a light beam and represented by the black dot. The toner is attached to a position, on the medium 101, corresponding to the position of the LED element 30 that is emitting a light beam. A white dot denoted with numeral 902 represents the LED element 30 that is emitting no light beam. The toner is not attached to a position, on the medium 101, corresponding to the position of the LED element 30 that is emitting no light beam and represented by the white dot. In Examples 1-1 to 1-6, the respective dimensions of each of the LED elements 30 in the LED array 300 were set as follows. The array pitch PE was 42 μm, the width XE was 21 μm, and the length YE was 21 μm. The width XP of the tip end 361 of the electrode 36 was 5 μm. Tables 2 to 7 each also describe a value of |HL−HR| and the value of the symmetric property S.

As appreciated from Tables 2 to 7, a print result was "good" when the symmetric property S was equal to or smaller than +0.65. When the value of the offset amount (Lo−LB) was increased to be greater than the maximum value described in Tables 2 to 7, a result of the evaluation of the printed image was less favorable than the reference. When the value of the offset amount was decreased to be smaller than the minimum value described in Tables 2 to 7, a result of the evaluation of the printed image was also less favorable than the reference. The local minimum value So of the symmetric property S depending on a change in the absolute value OSA of the offset amount of each of the lens arrays 1 corresponding to the respective Examples 1-1 to 1-6 was 0.5. A ratio, to the local minimum value So, of the value of the symmetric property S in a case where the result of the evaluation of the printed image was "good" was equal to or smaller than 130%. Consequently, it was confirmed that each of the lens arrays 1 according to the respective Examples 1-1 to 1-6 satisfied the foregoing expression [4].

Table 8 describes together the absolute value |Lo−LB| of the offset amount which is represented by OSA, a lower limit value of OSA that achieved a "good" printed image which is represented by OSA1, an upper limit value of OSA that achieved a "good" printed image which is represented by OSA2, and OSA in a case where the symmetric property S had the local minimum value So which is represented by OB.

TABLE 8

| | Height Z1 [mm] | Focal distance LB [mm] | OSA1 [mm] | OB [mm] | OSA2 [mm] |
|---|---|---|---|---|---|
| Example 1-1 | 4.394 | 2.201 | 0.12 | 0.24 | 0.36 |
| Example 1-2 | 4.379 | 2.298 | 0.14 | 0.27 | 0.40 |
| Example 1-3 | 4.369 | 2.369 | 0.15 | 0.29 | 0.43 |
| Example 1-4 | 4.290 | 2.785 | 0.22 | 0.41 | 0.60 |

TABLE 8-continued

| | Height Z1 [mm] | Focal distance LB [mm] | OSA1 [mm] | OB [mm] | OSA2 [mm] |
|---|---|---|---|---|---|
| Example 1-5 | 4.252 | 2.910 | 0.24 | 0.44 | 0.64 |
| Example 1-6 | 4.111 | 3.815 | 0.42 | 0.72 | 1.02 |

Figure 24:
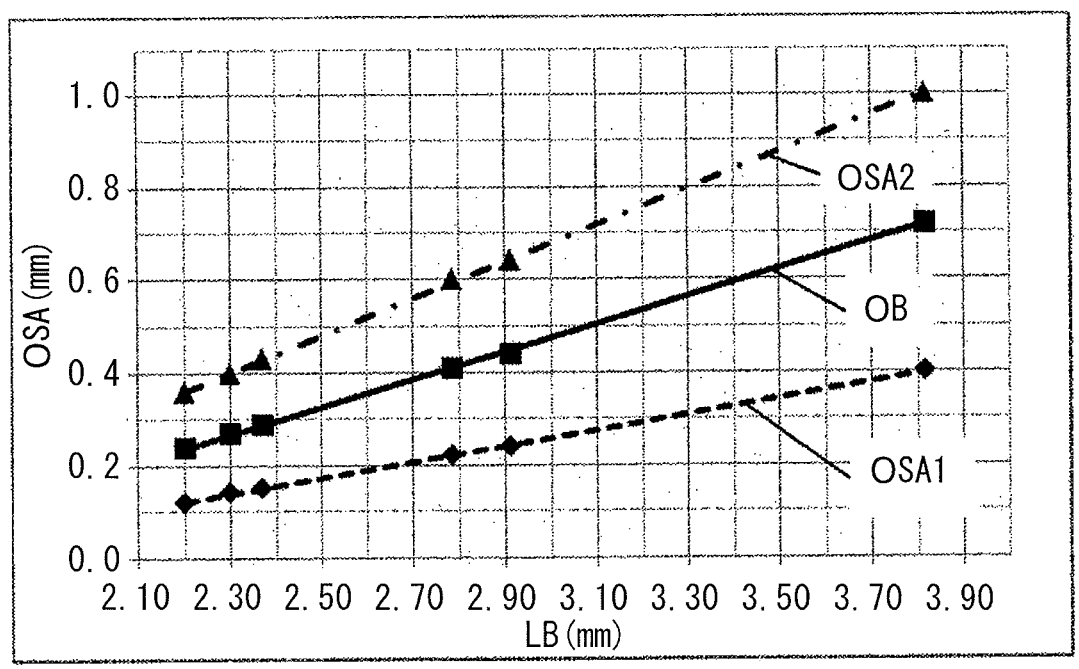
FIG. 24 is a characteristic diagram illustrating a relationship between a focal distance of each of the lens arrays according to the respective Examples 1-1 to 1-6 and each of OSA1, OB, and OSA2.

FIG. 24 is a characteristic diagram illustrating a relationship between the focal distance LB and each of OSA1, OB, and OSA2 in Table 8. In FIG. 24, the value of OB is plotted with a black square (■), the value of OSA1 is plotted with a black diamond (♦), and the value of OSA2 is plotted with a black triangle (▲). A solid line is a straight line that connects the black squares (■) with which the values of OB are plotted. A dashed line is a straight line that connects the black diamonds (♦) with which the values of OSA1 are plotted. A dashed-dotted line is a straight line that connects the black triangles (▲) with which the values of OSA2 are plotted. Each of the distance Lo and the distance Li may be varied in a range from OSA1 to OSA2 both inclusive with respective to the focal distance LB, depending on the focal distance LB of the lens array 1. By varying each of the distance Lo and the distance Li in such a way, it is possible to achieve print more favorable than that achieved in a case where each of the distance Lo and the distance Li is set to be equal to the focal distance LB.

The following expression [9] is obtained by approximating the values of OSA1 in Table 8 to a linear function of the focal distance LB. The following expression [10] is obtained by approximating the values of OSA2 in Table 8 to a linear function of the focal distance LB.

$$OSA1 = 0.184 \times LB - 0.288 \quad [9]$$

$$OSA2 = 0.408 \times LB - 0.538 \quad [10]$$

Accordingly, a range of OSA, with respect to the focal distance LB of the lens array 1, that achieves "good" print is expressed by the following expression [11].

$$0.184 \times LB - 0.288 \leq OSA \leq 0.408 \times LB - 0.538 \quad [11]$$

The focal distance LB of each of the lens arrays 1 according to the respective Examples 1-1 to 1-6 falls within a range from 2.201 mm to 3.815 mm. Accordingly, a range of the value of OSA achieving "good" print is from 0.12 mm to 1.02 mm.

Figure 25:
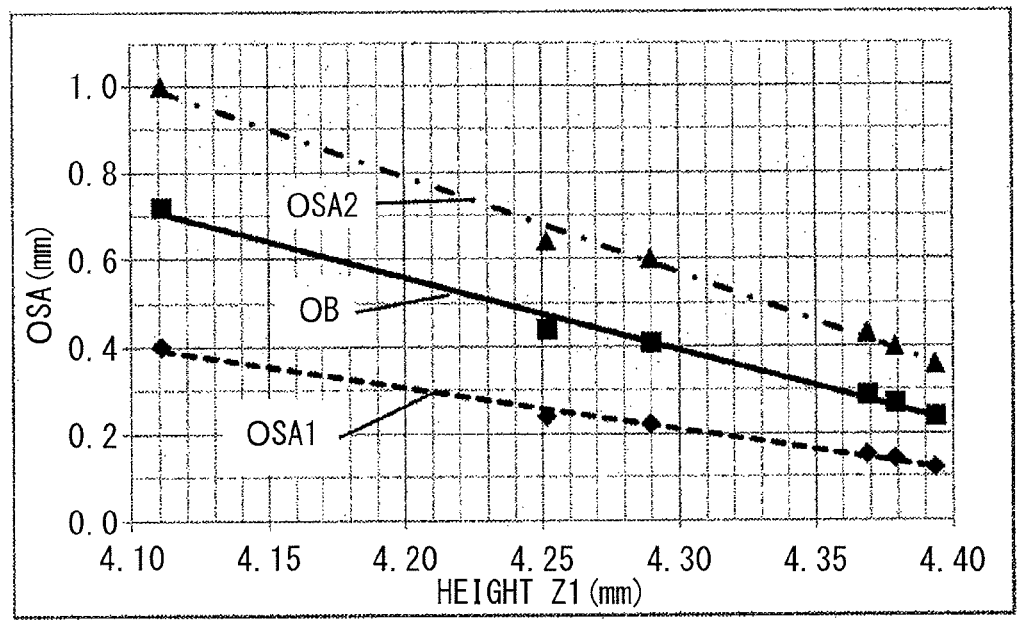
FIG. 25 is a characteristic diagram illustrating a relationship between a height of each of the lens arrays according to the respective Examples 1-1 to 1-6 and each of OSA1, OB, and OSA2.

FIG. 25 is a characteristic diagram illustrating a relationship between the height Z1 of the lens array 1 and each of OSA1, OB, and OSA2 in Table 8. In FIG. 25, the value of OB is plotted with a black square (■), the value of OSA1 is plotted with a black diamond (♦), and the value of OSA2 is plotted with a black triangle (▲). A solid line is a straight line that connects the black squares (■) with which the values of OB are plotted. A dashed line is a straight line that connects the black diamonds (♦) with which the values of OSA1 are plotted. A dashed-dotted line is a straight line that connects the black triangles (▲) with which the values of OSA2 are plotted. Each of the distance Lo and the distance Li may be varied in a range from OSA1 to OSA2 both inclusive with respective to the focal distance LB, depending on the height Z1 of the lens array 1. By varying each of the distance Lo and the distance Li in such a way, it is possible to achieve print more favorable than that achieved in a case where each of the distance Lo and the distance Li is set to be equal to the focal distance LB.

The following expression [12] is obtained by approximating the values of OSA1 in Table 8 to a linear function of the height Z1. The following expression [13] is obtained by approximating the values of OSA2 in Table 8 to a linear function of the height Z1.

$$OSA1=-1.024 \times Z1+4.616 \quad [12]$$

$$OSA2=-2.269 \times Z1+10.330 \quad [13]$$

Accordingly, a range of OSA, with respect to the height Z1 of the lens array 1, that achieves "good" print is expressed by the following expression [14].

$$-1.024 \times Z1+4.616 \leq OSA \leq -2.269 \times Z1+10.330 \quad [14]$$

The height Z1 of each of the lens arrays 1 according to the respective Examples 1-1 to 1-6 falls within a range from 4.111 mm to 4.394 mm. Accordingly, a range of the value of OSA that achieves "good" print is from 0.12 mm to 1.02 mm.

Table 9 describes together an amount of change in OSA from OB which is represented by SB, a lower limit value of SB that achieves a "good" printed image which is represented by SB1, and an upper limit value of SB that achieves a "good" printed image which is represented by SB2.

TABLE 9

| | Height Z1 [mm] | Focal distance LB [mm] | OB [mm] | SB1 [mm] | SB2 [mm] |
| --- | --- | --- | --- | --- | --- |
| Example 1-1 | 4.394 | 2.201 | 0.24 | −0.12 | 0.12 |
| Example 1-2 | 4.379 | 2.298 | 0.27 | −0.13 | 0.13 |
| Example 1-3 | 4.369 | 2.369 | 0.29 | −0.14 | 0.14 |
| Example 1-4 | 4.290 | 2.785 | 0.41 | −0.19 | 0.19 |
| Example 1-5 | 4.252 | 2.910 | 0.44 | −0.20 | 0.20 |
| Example 1-6 | 4.111 | 3.815 | 0.72 | −0.30 | 0.30 |

Figure 26:
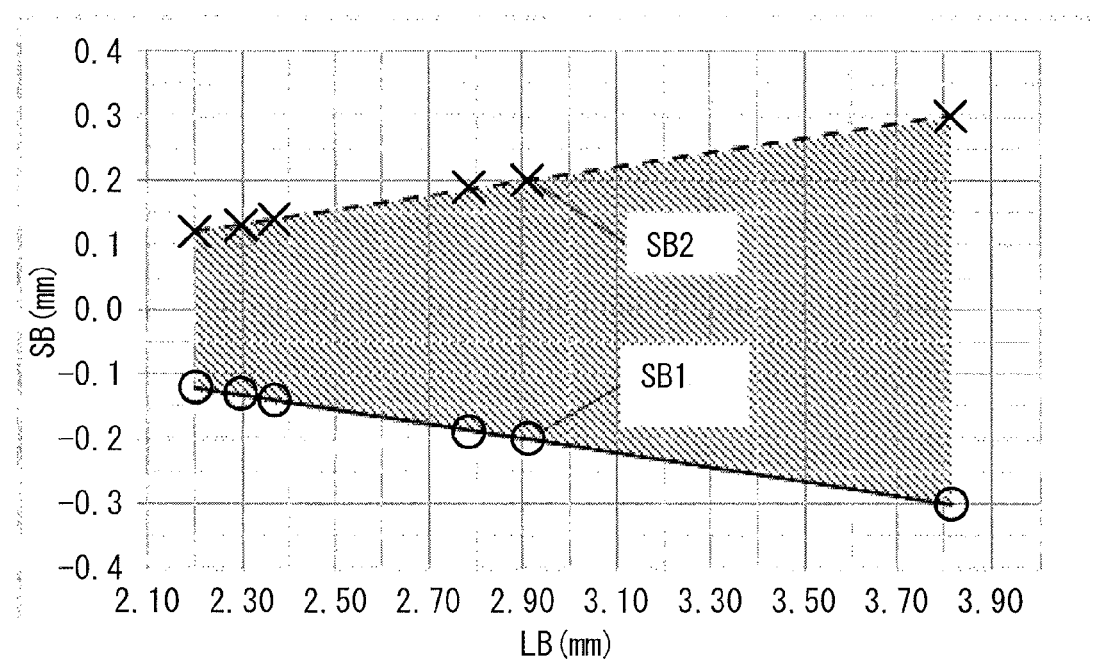
FIG. 26 is a characteristic diagram illustrating a relationship between the focal distance of each of the lens arrays according to the respective Examples 1-1 to 1-6 and each of SB1 and SB2.

FIG. 26 is a characteristic diagram illustrating a relationship between the focal distance LB and each of SB1 and SB2 in Table 9. In FIG. 26, the value of SB1 is plotted with a white circle (○), and the value of SB2 is plotted with a cross (x). A solid line is a straight line that connects the white circles (○) with which the values of SB1 are plotted. A dashed line is a straight line that connects the crosses (x) with which the values of SB2 are plotted. OSA may be varied from OB in a range from SB1 to SB2 both inclusive, depending on the focal distance LB of the lens array 1. By varying OSA in such a way, it is possible to achieve print more favorable than that achieved in a case where each of the distance Lo and the distance Li is set to be equal to the focal distance LB.

The following expression [15] is obtained by approximating the values of SB1 in Table 9 to a linear function of the focal distance LB. The following expression [16] is obtained by approximating the values of SB2 in Table 9 to a linear function of the focal distance LB.

$$SB1=-0.112 \times LB+0.125 \quad [15]$$

$$SB2=0.112 \times LB-0.125 \quad [16]$$

Accordingly, a range of SB, with respect to the focal distance LB of the lens array 1, that achieves "good" print is expressed by the following expression [17].

$$-0.112 \times LB+0.125 \leq SB \leq 0.112 \times LB-0.125 \quad [17]$$

The focal distance LB of each of the lens arrays 1 according to the respective Examples 1-1 to 1-6 falls within a range from 2.201 mm to 3.815 mm. Accordingly, a range of the value of SB that achieves "good" print is from −0.30 mm to +0.30 mm.

Figure 27:
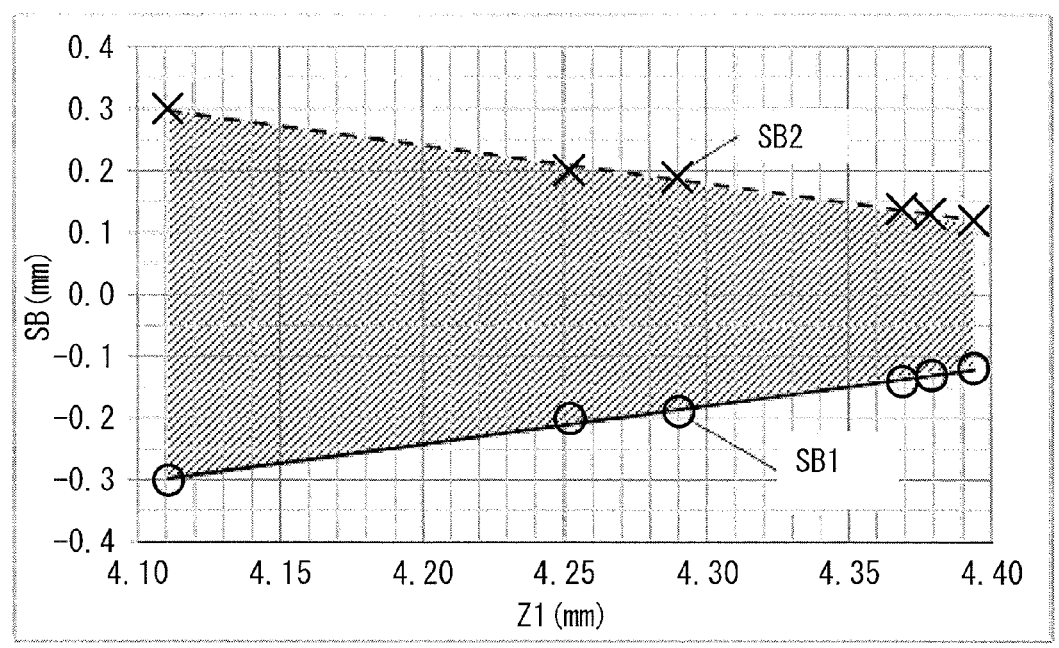
FIG. 27 is a characteristic diagram illustrating a relationship between the height of each of the lens arrays according to the respective Examples 1-1 to 1-6 and each of SB1 and SB2.

FIG. 27 is a characteristic diagram illustrating a relationship between the height Z1 of the lens array 1 and each of SB1 and SB2 in Table 9. In FIG. 27, the value of SB1 is plotted with a white circle (○), and the value of SB2 is plotted with a cross (x). A solid line is a straight line that connects the white circles (○) with which the values of SB1 are plotted. A dashed line is a straight line that connects the crosses (x) with which the values of SB2 are plotted. OSA may be varied from OB in a range from SB1 to SB2 both inclusive, depending on the height Z1 of the lens array 1. By varying OSA in such a way, it is possible to achieve print more favorable than that achieved in a case where each of the distance Lo and the distance Li is set to be equal to the focal distance LB.

The following expression [18] is obtained by approximating the values of SB1 in Table 9 to a linear function of the height Z1. The following expression [19] is obtained by approximating the values of SB2 in Table 9 to a linear function of the height Z1.

$$SB1=0.623 \times Z1-2.857 \quad [18]$$

$$SB2=-0.623 \times Z1+2.857 \quad [19]$$

Accordingly, a range of SB, with respect to the height Z1 of the lens array 1, that achieves "good" print is expressed by the following expression [20].

$$0.623 \times Z1-2.857 \leq SB \leq -0.623 \times Z1+2.857 \quad [20]$$

The height Z1 of each of the lens arrays 1 according to the respective Examples 1-1 to 1-6 falls within a range from 4.111 mm to 4.394 mm. Accordingly, a range of the value of SB that achieves "good" print is from −0.3 mm to 0.3 mm.

According to Examples 1-1 to 1-6 described above, it was confirmed that it was possible to suppress occurrence of printing failure such as streaks and unevenness of density in the printed image formed by the image forming apparatus, by so disposing the LED array 300 and the lens array 1 that the distance Lo from the LED array 300 to the lens array 1 was different from the focal distance LB in which a contrast of the optical image became maximum to thereby form an unclear optical image.

4. OTHER MODIFICATIONS

The technology has been described above referring to some example embodiments and modifications thereof. However, the technology is not limited to the above-described example embodiments and modifications thereof, and is variously modifiable. For example, the foregoing example embodiment has the configuration in which the lens array 1 includes the rod lenses 11 that are arranged in two lines. However, factors such as the arrangement, the positions, and the number of the rod lenses are not limited to those described in the example embodiment and the modifications above.

The description is given of the foregoing example embodiment referring to the image forming apparatus 100 that uses a primary transfer method as an example. However, the technology is also applicable to a secondary transfer method.

Moreover, the description is given of the foregoing example embodiment referring to the image forming apparatus having a printing function as one specific but non-limiting example of an "image forming apparatus" of the technology. However, the image forming apparatus of the technology is not limited to the image forming apparatus having the printing function. Specifically, the technology is also applicable to an image forming apparatus that serves as a multi-function peripheral having functions such as a scanning function and a fax function in addition to the printing function, for example.

Furthermore, the technology encompasses any possible combination of some or all of the various embodiments and the modifications described herein and incorporated herein.

It is possible to achieve at least the following configurations from the above-described example embodiments of the technology.

<1>

An exposure unit including:

a light-emitting element array including a plurality of light-emitting elements that are disposed in a first direction and each emit a light beam; and a lens array that faces the light-emitting element array in a second direction that is orthogonal to the first direction, and focuses the light beams emitted from the respective light-emitting elements, wherein the following expression [3] is satisfied, and a symmetric property, determined from the following expression [1], of a light amount distribution in the first direction of at least one of the light beams focused by the lens array satisfies the following expression [2], $$S=|(HL-HR)/(XE/2)| \quad [1]$$

$$0 \le S \le 0.65 \quad [2]$$

$$Lo \ne LB \quad [3]$$

where S is the symmetric property of the light amount distribution in the first direction of any of the light beams focused by the lens array, XE is a dimension of any of the light-emitting elements in the first direction, HL is a difference between a local maximum position and a first local minimum position that are adjacent to each other in the light amount distribution in the first direction of any of the light beams focused by the lens array, HR is a difference between the local maximum position and a second local minimum position in the light amount distribution in the first direction of any of the light beams focused by the lens array, the second local minimum position being adjacent to the local maximum position and located on an opposite side of the local maximum position to the first local minimum position, Lo is a distance from the light-emitting element array to the lens array, and LB is a focal distance of the lens array in which a contrast becomes maximum, the contrast being determined from the light amount distribution in the first direction of any of the light beams focused by the lens array.

<2>

The exposure unit according to <1>, wherein an average value of the symmetric properties, each determined from the expression [1], of the light amount distributions in the first direction of all of the light beams focused by the lens array satisfies the expression [2].

<3>

The exposure unit according to <1> or <2>, wherein the symmetric properties, each determined from the expression [1], of the light amount distributions in the first direction of all of the light beams focused by the lens array each satisfy the expression [2].

<4>

The exposure unit according to any one of <1> to <3>, wherein the following expression [4] is further satisfied, $$(S/So) \le 1.3 \quad [4]$$

where So is a local minimum value of the symmetric property depending on a change in a value of $|Lo-LB|$.

<5>

The exposure unit according to any one of <1> to <4>, wherein the following expression [5]: $0.184 \times LB - 0.288 \le |Lo-LB| \le 0.408 \times LB - 0.538$ is further satisfied.

<6>

The exposure unit according to any one of <1> to <5>, wherein the following expression [6] is further satisfied, $$0.112 \times LB + 0.125 \le SB \le 0.112 \times LB - 0.125 \quad [6]$$

where SB is an amount of change in a value of $|Lo-LB|$ from OB, OB being the value of $|Lo-LB|$ corresponding to a local minimum value of the symmetric property.

<7>

The exposure unit according to any one of <1> to <6>, wherein the following expression [7] is further satisfied, $$1.024 \times Z1 + 4.616 < |Lo-LB| \le -2.269 \times Z1 + 10.330 \quad [7]$$

where Z1 is a dimension of the lens array in an optical-axis direction of the lens array.

<8>

The exposure unit according to any one of <1> to <7>, wherein the following expression [8] is further satisfied, $$0.623 \times Z1 - 2.857 \le SB \le -0.623 \times Z1 + 2.857 \quad [8]$$

where SB is an amount of change in a value of $|Lo-LB|$ from OB, OB being the value of $|Lo-LB|$ corresponding to a local minimum value of the symmetric property, and Z1 is a dimension of the lens array in an optical-axis direction of the lens array.

<9>

The exposure unit according to <6> or <8>, wherein the following expression [9]: $-0.3$ mm $\le SB \le 0.3$ mm is further satisfied.

<10>

The exposure unit according to any one of <1> to <9>, wherein the following expression [10] is further satisfied, $$26.6 \le LB + 5.57 \times Z1 \le 26.8 \quad [10]$$

where Z1 is a dimension of the lens array in an optical-axis direction of the lens array.

<11>

The exposure unit according to any one of <1> to <10>, wherein the following expression [11] is further satisfied, $$4.111 \text{ mm} \le Z1 \le 4.394 \text{ mm} \quad [11]$$

where Z1 is a dimension of the lens array in an optical-axis direction of the lens array.

<12>

The exposure unit according to any one of <1> to <11>, wherein the following expression [12]: $0.12$ mm $\le Lo-LB \le 1.02$ mm is further satisfied.

<13>

The exposure unit according to any one of <1> to <12>, wherein the following expression [13]: 2.201 mm≤LB≤3.815 mm is further satisfied.

<14>

The exposure unit according to any one of <1> to <13>, wherein the lens array includes a plurality of rod lenses each having a radius that is equal to or greater than about 0.14 millimeters and is equal to or smaller than about 0.16 millimeters.

<15>

An image forming unit including the exposure unit according to any one of <1> to <14>.

<16>

An image forming apparatus including the exposure unit according to any one of <1> to <14>.

Although the technology has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. An exposure unit comprising:
a light-emitting element array including a plurality of light-emitting elements that are disposed in a first direction and each emit a light beam; and
a lens array that faces the light-emitting element array in a second direction that is orthogonal to the first direction, and focuses the light beams emitted from the respective light-emitting elements, the lens array having an optical axis in the second direction, wherein
the following expression [3] is satisfied, and
an average value of symmetric properties, each determined from the following expression [1], of light amount distributions in the first direction of all of the light beams focused by the lens array satisfies the following expression [2],
wherein the light amount distributions each include a local maximum position, a first local minimum position, and a second local minimum position, the local maximum position corresponding to a position of one of the light-emitting elements and being a position at which a light amount becomes a local maximum value, the first local minimum position being adjacent to the local maximum position in the first direction and being a position at which the light amount becomes a first local minimum value that is smaller than the local maximum value, and the second local minimum position being positioned on an opposite side of the first local minimum position in the first direction as seen from the local maximum position and being a position at which the light amount becomes a second local minimum value that is smaller than the local maximum value,
wherein the lens array has a first line and a second line, the first line including a plurality of first rod lenses that are arranged in the first direction, the second line including a plurality of second rod lenses that are arranged in the first direction, and being adjacent to the first line in a third direction that is orthogonal to both the first direction and the second direction, and
wherein the plurality of light-emitting elements are positioned on an extension, the extension being in the second direction and positioned substantially in the middle of the first line and the second line in the third direction, $$S=|(HL-HR)/(XE/2)| \quad [1]$$

$$0 \le S \le 0.65 \quad [2]$$

$$Lo \ne LB \quad [3]$$

where

S is the symmetric property of the light amount distribution in the first direction of each of the light beams focused by the lens array, XE is a dimension of each of the light-emitting elements in the first direction, HL is a difference between the local maximum position and the first local minimum position in the first direction of each of the light beams focused by the lens array, HR is a difference between the local maximum position and the second local minimum position in the first direction of each of the light beams focused by the lens array, Lo is a distance from the light-emitting element array to the lens array, and LB is a focal distance of the lens array in which a contrast becomes maximum, the contrast being determined from the light amount distribution in the first direction of each of the light beams focused by the lens array.

2. The exposure unit according to claim 1, wherein the symmetric properties, each determined from the expression [1], of the light amount distributions in the first direction of all of the light beams focused by the lens array each satisfy the expression [2].

3. The exposure unit according to claim 1, wherein the following expression [4] is further satisfied, $$(S/So) \le 1.3 \quad [4]$$

where So is a local minimum value of the symmetric property depending on a change in a value of |Lo−LB|.

4. The exposure unit according to claim 1, wherein the following expression [5]: 0.184×LB 0.288≤|Lo−LB|≤0.408×LB−0.538 is further satisfied.

5. The exposure unit according to claim 1, wherein the following expression [6] is further satisfied, $$-0.112 \times LB + 0.125 \le SB \le 0.112 \times LB - 0.125 \quad [6]$$

where SB is an amount of change in a value of |Lo−LB| from OB, OB being the value of |Lo−LB| corresponding to a local minimum value of the symmetric property.

6. The exposure unit according to claim 1, wherein the following expression [7] is further satisfied, $$-1.024 \times Z1 + 4.616 \leq |Lo-LB| \leq -2.269 \times Z1 + 10.330 \quad [7]$$

where Z1 is a dimension of the lens array in an optical-axis direction of the lens array.

7. The exposure unit according to claim 1, wherein the following expression [8] is further satisfied, $$0.623 \times Z1 - 2.857 \leq SB \leq -0.623 \times Z1 + 2.857 \quad [8]$$

where SB is an amount of change in a value of |Lo–LB| from OB, OB being the value of |Lo–LB| corresponding to a local minimum value of the symmetric property, and Z1 is a dimension of the lens array in an optical-axis direction of the lens array.

8. The exposure unit according to claim 5, wherein the following expression [9]: –0.3 mm ≤ SB ≤ 0.3 mm is further satisfied.

9. The exposure unit according to claim 1, wherein the following expression [10] is further satisfied, $$26.6 \leq LB + 5.57 \times Z1 \leq 26.8 \quad [10]$$

where Z1 is a dimension of the lens array in an optical-axis direction of the lens array.

10. The exposure unit according to claim 1, wherein the following expression [11] is further satisfied, $$4.111 \text{ mm} \leq Z1 \leq 4.394 \text{ mm} \quad [11]$$

where Z1 is a dimension of the lens array in an optical-axis direction of the lens array.

11. The exposure unit according to claim 1, wherein the following expression [12]: 0.12 mm ≤ |Lo–LB| ≤ 1.02 mm is further satisfied.

12. The exposure unit according to claim 1, wherein the following expression [13]: 2.201 mm ≤ LB ≤ 3.815 mm is further satisfied.

13. The exposure unit according to claim 1, wherein the lens array includes a plurality of rod lenses each having a radius that is equal to or greater than about 0.14 millimeters and is equal to or smaller than about 0.16 millimeters.

14. An image forming unit provided with an exposure unit, the exposure unit comprising:
- a light-emitting element array including a plurality of light-emitting elements that are disposed in a first direction and each emit a light beam; and
- a lens array that faces the light-emitting element array in a second direction that is orthogonal to the first direction, and focuses the light beams emitted from the respective light-emitting elements, the lens array having an optical axis in the second direction, wherein
the following expression [3] is satisfied, and
an average value of symmetric properties, each determined from the following expression [1], of light amount distributions in the first direction of all of the light beams focused by the lens array satisfies the following expression [2],
wherein the light amount distributions each include a local maximum position, a first local minimum position, and a second local minimum position, the local maximum position corresponding to a position of one of the light-emitting elements and being a position at which a light amount becomes a local maximum value, the first local minimum position being adjacent to the local maximum position in the first direction and being a position at which the light amount becomes a first local minimum value that is smaller than the local maximum value, and the second local minimum position being positioned on an opposite side of the first local minimum position in the first direction as seen from the local maximum position and being a position at which the light amount becomes a second local minimum value that is smaller than the local maximum value,
wherein the lens array has a first line and a second line, the first line including a plurality of first rod lenses that are arranged in the first direction, the second line including a plurality of second rod lenses that are arranged in the first direction, and being adjacent to the first line in a third direction that is orthogonal to both the first direction and the second direction, and
wherein the plurality of light-emitting elements are positioned on an extension, the extension being in the second direction and positioned substantially in the middle of the first line and the second line in the third direction, $$S = |(HL - HR)/(XE/2)| \quad [1]$$

$$0 \leq S \leq 0.65 \quad [2]$$

$$Lo \neq LB \quad [3]$$

where S is the symmetric property of the light amount distribution in the first direction of each of the light beams focused by the lens array, XE is a dimension of each of the light-emitting elements in the first direction, HL is a difference between the local maximum position and a first local minimum position that are adjacent to each other in the first direction of each of the light beams focused by the lens array, HR is a difference between the local maximum position and the second local minimum position in the first direction of each of the light beams focused by the lens array, Lo is a distance from the light-emitting element array to the lens array, and LB is a focal distance of the lens array in which a contrast becomes maximum, the contrast being determined from the light amount distribution in the first direction of each of the light beams focused by the lens array.

15. An image forming apparatus provided with an exposure unit, the exposure unit comprising:
- a light-emitting element array including a plurality of light-emitting elements that are disposed in a first direction and each emit a light beam; and
- a lens array that faces the light-emitting element array in a second direction that is orthogonal to the first direction, and focuses the light beams emitted from the respective light-emitting elements, wherein
the following expression [3] is satisfied, and
an average value of symmetric properties, each determined from the following expression [1], of light amount distributions in the first direction of all of the light beams focused by the lens array satisfies the following expression [2],
wherein the light amount distributions each include a local maximum position, a first local minimum position, and a second local minimum position, the local maximum position corresponding to a position of one of the light-emitting elements and being a position at which a light amount becomes a local maximum value, the first local minimum position being adjacent to the local maximum position in the first direction and being a position at which the light amount becomes a first local minimum value that is smaller than the local maximum value, and the second local minimum position being positioned on an opposite side of the first local minimum position in the first direction as seen from the local maximum position and being a position at which the light amount becomes a second local minimum value that is smaller than the local maximum value, wherein the lens array has a first line and a second line, the first line including a plurality of first rod lenses that are arranged in the first direction, the second line including a plurality of second rod lenses that are arranged in the first direction, and being adjacent to the first line in a third direction that is orthogonal to both the first direction and the second direction, and wherein the plurality of light-emitting elements are positioned on an extension, the extension being in the second direction and positioned substantially in the middle of the first line and the second line in the third direction, $$S=|(HL-HR)/(XE/2)| \quad [1]$$

$$0 \le S \le 0.65 \quad [2]$$

$$Lo \ne LB \quad [3]$$

where S is the symmetric property of the light amount distribution in the first direction of each of the light beams focused by the lens array, XE is a dimension of each of the light-emitting elements in the first direction, HL is a difference between the local maximum position and a first local minimum position in the first direction of each of the light beams focused by the lens array, HR is a difference between the local maximum position and the second local minimum position in the first direction of each of the light beams focused by the lens array, Lo is a distance from the light-emitting element array to the lens array, and LB is a focal distance of the lens array in which a contrast becomes maximum, the contrast being determined from the light amount distribution in the first direction of each of the light beams focused by the lens array.

* * * * *